(12) United States Patent
Li

(10) Patent No.: US 11,880,800 B2
(45) Date of Patent: Jan. 23, 2024

(54) SYSTEMS AND METHODS FOR IMPLEMENTING HAILING REQUEST AND SHIPPING REQUEST

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 0 days.

(21) Appl. No.: 17/492,584

(22) Filed: Oct. 2, 2021

(65) Prior Publication Data

US 2022/0027843 A1 Jan. 27, 2022

Related U.S. Application Data

(63) Continuation-in-part of application No. 16/024,840, filed on Jun. 30, 2018, now Pat. No. 11,194,399.

(51) Int. Cl.
| | |
|---|---|
| *G06Q 10/0832* | (2023.01) |
| *G06F 3/01* | (2006.01) |
| *G06Q 50/30* | (2012.01) |
| *B60W 60/00* | (2020.01) |
| *G06V 40/20* | (2022.01) |
| *G06V 40/10* | (2022.01) |

(52) U.S. Cl.
CPC ... *G06Q 10/0832* (2013.01); *B60W 60/00256* (2020.02); *G06F 3/017* (2013.01); *G06Q 50/30* (2013.01); *G06V 40/107* (2022.01); *G06V 40/28* (2022.01)

(58) Field of Classification Search
CPC .................................................. G06Q 10/0832
See application file for complete search history.

(56) References Cited

U.S. PATENT DOCUMENTS

| | | | |
|---|---|---|---|
| 3,005,488 A1 | 8/2011 | Staffaroni et al. | |
| 11,067,986 B2 * | 7/2021 | Umetani | ............... B60W 30/00 |
| 11,144,870 B2 * | 10/2021 | Loubriel | ............ G06Q 10/0835 |
| 11,449,056 B2 * | 9/2022 | Iagnemma | ........ H04M 1/72403 |
| 2019/0212738 A1 | 7/2019 | Umetani et al. | |
| 2019/0361447 A1 | 11/2019 | Rander et al. | |
| 2021/0142276 A1 * | 5/2021 | Gupte | ...................... G07F 17/10 |
| 2021/0253120 A1 * | 8/2021 | Ahire | ...................... G06F 3/017 |
| 2022/0027843 A1 * | 1/2022 | Li | ........................... G06V 40/28 |
| 2022/0349720 A1 * | 11/2022 | Gao | .................... G01C 21/3697 |

* cited by examiner

*Primary Examiner* — Michael A Berns

(57) ABSTRACT

Systems and methods for hailing a vehicle for a ride or shipping a parcel. A user hails a vehicle with a gesture or app. A hailed vehicle carries the user to a destination or picks up a parcel from the user and performs shipping procedures.

20 Claims, 11 Drawing Sheets

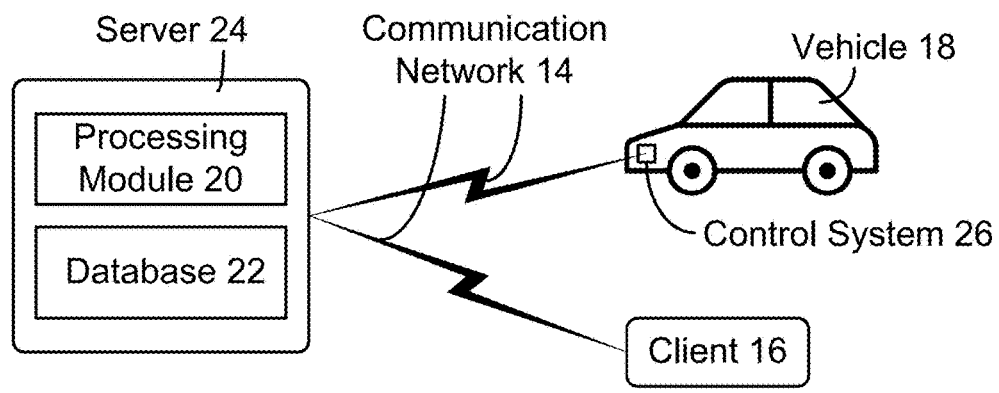
FIG. 1-A
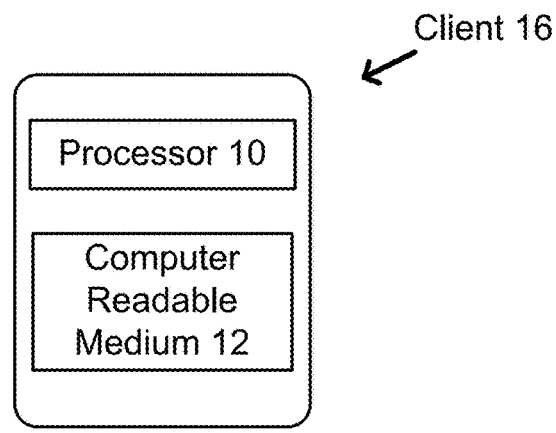
FIG. 1-B
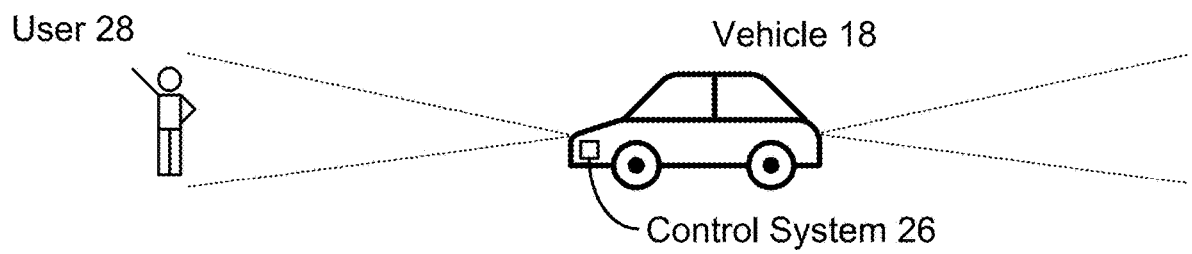
FIG. 1-C

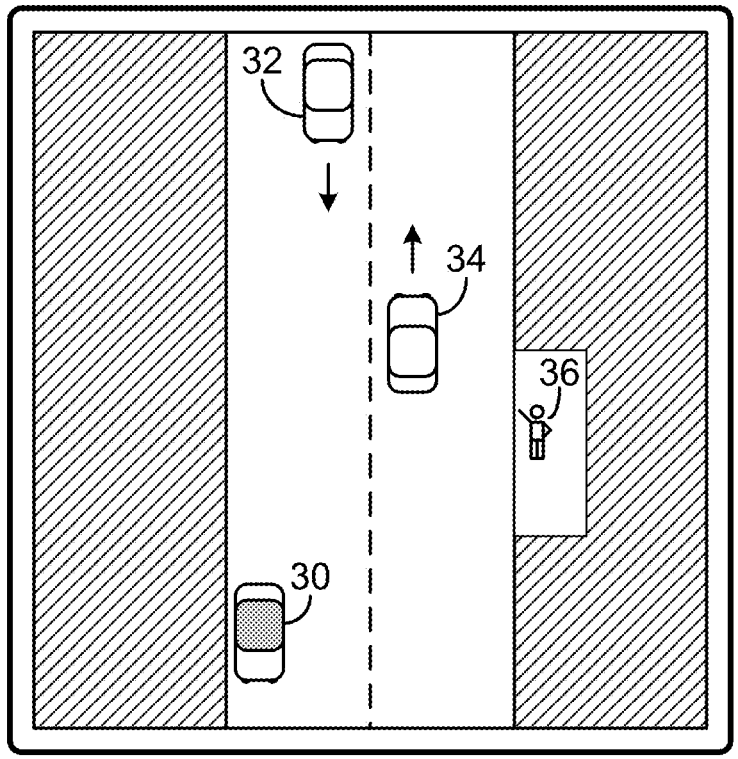
FIG. 2-A
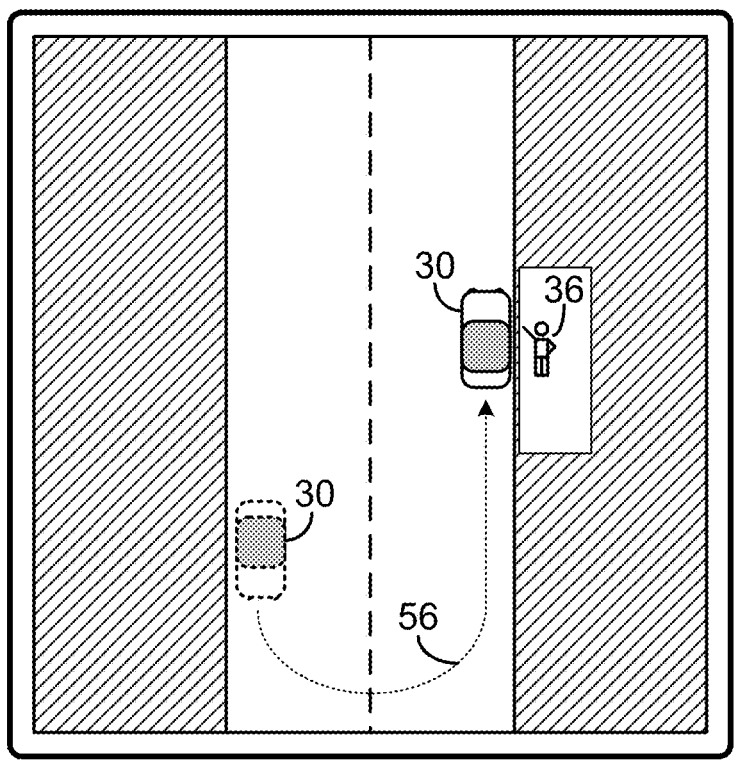
FIG. 2-B

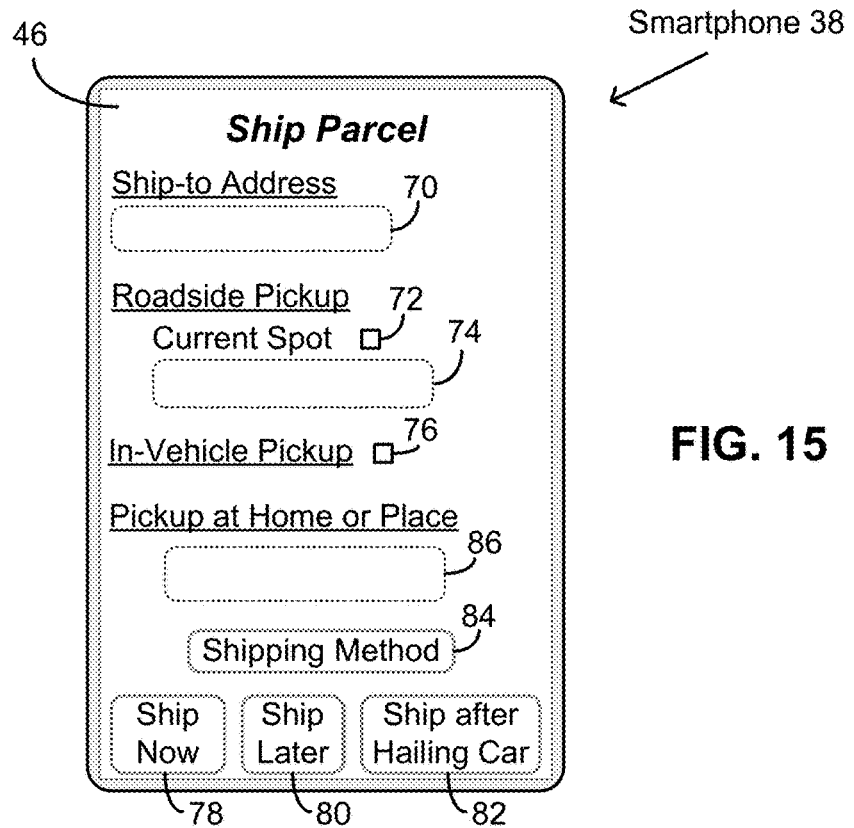
FIG. 15
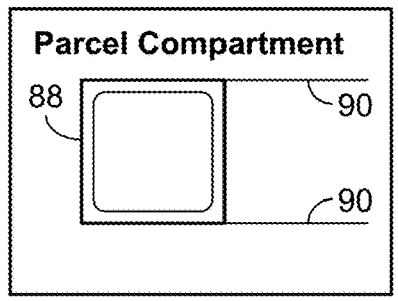
FIG. 16-A
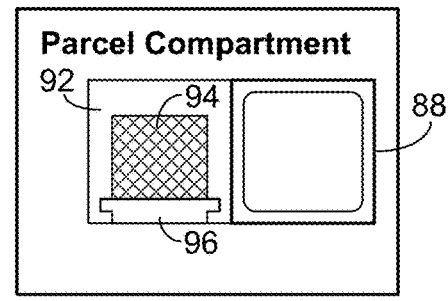
FIG. 16-B
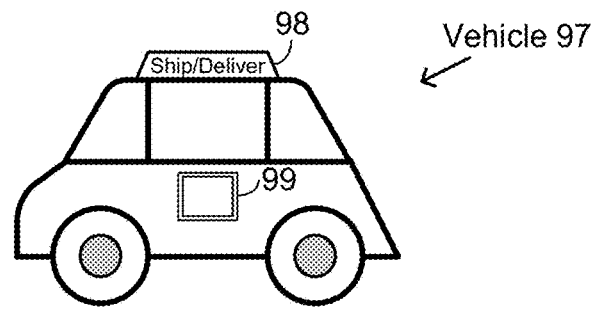
FIG. 17

SYSTEMS AND METHODS FOR IMPLEMENTING HAILING REQUEST AND SHIPPING REQUEST

CROSS REFERENCE TO RELATED APPLICATION

This is a continuation-in-part of U.S. patent application Ser. No. 16/024,840, filed Jun. 30, 2018.

BACKGROUND—FIELD OF INVENTION

This invention relates to hailing a vehicle and shipping a parcel, more particularly to hailing a vehicle for a ride, and hailing a vehicle for shipping a parcel.

BACKGROUND—DESCRIPTION OF PRIOR ART

Autonomous vehicle (also known as driverless or self-driving vehicle) is a vehicle capable of sensing and navigating around the vehicle's surroundings and travelling autonomously to a destination without user input. It represents a great advance in the transportation industry.

When autonomous vehicles become widely available, many users may rely on self-driving taxis or self-driving cargo vehicles to go to places and transport goods. Usually a user places an order online and then waits for a service to dispatch a vehicle. Sometimes, there are vehicles parked beside the curb, sitting at a parking lot, or running on a road. When a user sees a vehicle with a vacant sign, the user may want to hail it directly on site, instead of contacting a remote facility and going through an online ordering or reservation process.

Therefore, there exists a need for a user to hail an autonomous vehicle directly when the vehicle is in sight.

When a user wants to ship a parcel, the user may go to a store, a station, or a postal office. The user may also schedule a time for a driver to come and pick up a parcel. Going to a place or waiting for parcel pickup often takes time. Thus, there exists a need for a method to ship a parcel that is simple and saves time. The word "parcel" as used herein may indicate a package (e.g., a box, a bag, or an envelope) that contains one or more products or objects. The box includes a carton box, a cardboard box, or a wooden box. The bag includes a paper bag or a plastic bag.

As used herein, the word "vehicle" may indicate any form of motorized transportation or a device capable of moving around autonomously. Examples of vehicles may include automobile, drone, flying car, aircraft, ship, robot, and the like. For convenience of description, "Service Center" as used herein may mean a center or remote facility as a business entity or a server which is operated at Service Center. "Check in" as used herein may mean a user logs in a system at a vehicle using info obtained from a reservation or using other suitable info. A user may log in a system of a vehicle using a code, a password, a credit card, or an identification card. A user may also be considered as in logged-in state after being recognized or identified by a system. Mature identification mechanisms include, for example, facial recognition and fingerprint recognition. In one scenario, after a check-in process, the identity of a user may be confirmed. In another scenario, after a check-in process, the identity of a user may remain unknown.

OBJECTS AND ADVANTAGES

Accordingly, several main objects and advantages of the present invention are:

a). to provide improved systems and methods for hailing a vehicle for a ride and for shipping a parcel;
b). to provide such systems and methods for a user to hail a vehicle directly when the vehicle is in sight;
c). to provide such systems and methods which enable a user to hail a vehicle with gestures;
d). to provide such systems and methods which enable a user to find vehicles nearby;
e). to provide such systems and methods which enable a vehicle to recognize a user's gesture and drive to the user autonomously;
f). to provide such systems and methods for a user to ship a parcel using a vehicle hailing app or program;
g). to provide such systems and methods for a user to ship a parcel through a hailed vehicle; and
h). to provide such systems and methods which provide devices in a vehicle to accept a parcel, measure the weight and dimensions of a parcel, and attach shipping labels to a parcel.

Further objects and advantages will become apparent from a consideration of the drawings and ensuing description.

SUMMARY

In accordance with the present invention, vehicle hailing systems and methods are provided for picking up a user or receiving a parcel. When a user sees an autonomous vehicle, the user may hail it directly using a gesture. On the other hand, when an autonomous vehicle detects that a user is gesturing at it, the vehicle may calculate a route and navigate to the user. In addition, a user may find vehicles nearby via an app and select a vehicle with gestures. Using gestures to hail a vehicle is natural, intuitive, and convenient when the vehicle is visible in a short distance.

Further, a user may hail a vehicle by an app or gestures and then ship a parcel via the hailed vehicle. A parcel may be picked up by the roadside or received from an occupant inside a vehicle. Devices may be installed at a vehicle. The devices may take and keep a parcel, read messages on a parcel, measure the weight and dimensions of a parcel, and attach shipping labels to a parcel.

DRAWING FIGURES

FIG. 1-A is an exemplary diagram describing an embodiment involving a vehicle, a client system, and a server in accordance with the present invention.

FIG. 1-B is an exemplary diagram which depicts a client system in accordance with the present invention.

FIG. 1-C is an exemplary diagram which depicts a user and a vehicle in accordance with the present invention.

FIGS. 2-A and 2-B are exemplary diagrams which illustrate a hailing scenario in accordance with the present invention.

FIG. 15 is an exemplary diagram which illustrates interface settings for shipping a parcel in accordance with the present invention.

FIGS. 16A and 16-B are exemplary diagrams illustrating a parcel compartment of a vehicle in accordance with the present invention.

FIG. 17 is an exemplary diagram which illustrates a vehicle for receiving, shipping, and delivering parcels in accordance with the present invention.

Figure 18:
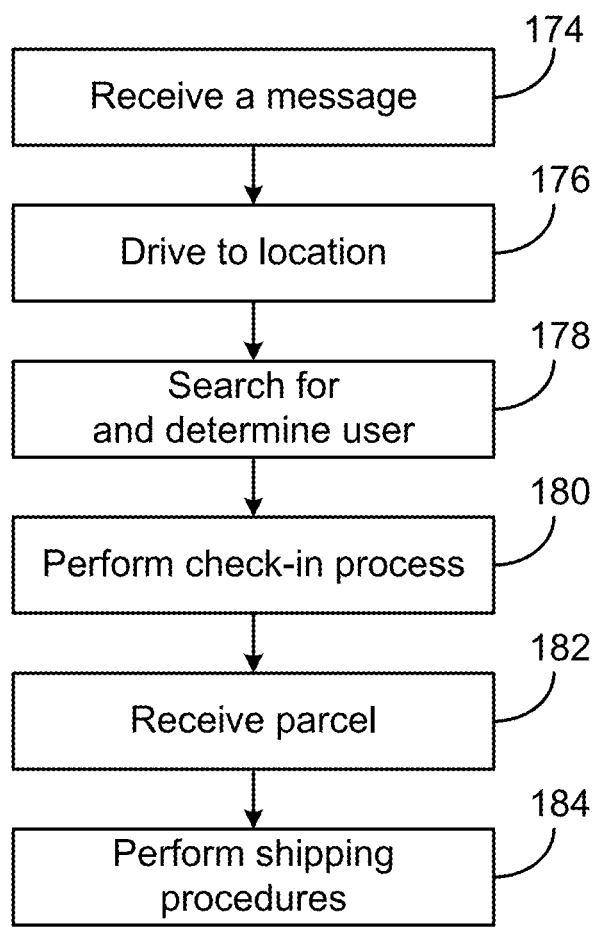

FIG. 18 is an exemplary flow diagram describing a parcel pickup and shipping process in accordance with the present invention.

REFERENCE NUMERALS IN DRAWINGS

| | |
|---|---|
| 10 | Processor |
| 12 | Computer Readable Medium |
| 14 | Communication Network |
| 16 | Client System |
| 18 | Vehicle |
| 20 | Processing Module |
| 22 | Database |
| 24 | Server |
| 26 | Control System |
| 28 | User |
| 30 | Vehicle |
| 32 | Vehicle |
| 34 | Vehicle |
| 36 | User |
| 38 | Smartphone |
| 40 | Button |
| 42 | Button |
| 44 | Button |
| 46 | Screen |
| 48 | Window |
| 50 | Button |
| 52 | Window |
| 54 | Button |
| 56 | Route |
| 58 | Button |
| 60 | Window |
| 62 | Window |
| 64 | Button |
| 66 | Button |
| 68 | Button |
| 70 | Space |
| 72 | Checkbox |
| 74 | Space |
| 76 | Checkbox |
| 78 | Button |
| 80 | Button |
| 82 | Button |
| 84 | Button |
| 86 | Space |
| 88 | Compartment Door |
| 90 | Tracks |
| 92 | Parcel Compartment |
| 94 | Parcel |
| 96 | Weighing Device |
| 97 | Vehicle |
| 98 | Sign |
| 99 | Compartment Door |

100-184 are exemplary steps.

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types.

FIG. 1-A is an exemplary block diagram of one embodiment according to the present invention. A vehicle 18 and server 24 are connected via a wireless communication network 14. So are a client system 16 and server 24. Vehicle 18 is controlled by a control system 26. Server 24 is installed and operated at Service Center. Service Center represents a ride-hailing business. It administers vehicles including vehicle 18 and processes hailing requests from users. The word "server" as used herein means a system or systems which may have similar functions and capacities as one or more servers. Server 24 may exemplarily be divided into two blocks, represented by a processing module 20 and database 22. Processing module 20 may include processing and communication functions. Database 22 may store vehicle service records and information, map data and geographic info of certain areas, user account information, user transaction records, etc. The database may include a cluster of memory chips and/or storage modules. In the figure, servers 24 may represent a device that collects, processes, stores, and maintains information and documents, sends instructions to vehicles, transmits messages to users, executes tasks requested by users, etc.

FIG. 1-B describes client system 16 exemplarily. Client system 16 may cover a range of electronic devices and gadgets, e.g., a smartphone, a tablet computer, a smart watch, a virtual reality (VR) device, an augmented reality (AR) device, and the like. Client system 16 may include a processor 10 and computer readable medium 12. Processor 10 may mean one or more processor chips or systems. Medium 12 may be the main part of a storage system and may include a memory hierarchy built by one or more memory chips or storage components like RAM, ROM, FLASH, or other suitable storage modules. Processor 10 may run programs or sets of executable instructions stored in medium 12 for performing various functions and tasks such as surfing on the Internet, placing purchase orders, hailing a vehicle, shipping a parcel, sending and receiving emails and short messages, playing video or music, etc. Client system 16 may also include input, output, and communication components, which may be individual modules or integrated with processor 10. The terms "Hailing (hail) a vehicle" and "Hail a car" as used herein may mean a physical act (e.g., a gesture), a verbal act (e.g., a voice request or command), or an online process which is performed by a user for ordering a vehicle for a ride, renting purpose, or parcel shipping, or for reserving a vehicle for present or future use.

In addition, client system 16 may have a display (not shown) and a graphical user interface (GUI). The display may have a liquid crystal display (LCD) screen or light emitting diode (LED) screen and may be arranged sensitive to touches, i.e., sensitive to haptic and/or tactile contact with a user. As well known in the art, contact detection technologies may include capacitive, resistive, infrared, optical, surface acoustic wave, and proximity sensing methods. A user may use the interface to interact with client system 16, Service Center or server 24, an e-commerce website, other online users, and so on. Via the interface, for instance, a user may hail a vehicle, ship a parcel, place online orders, play a game, communicate with other devices, obtain certain information, and so on.

Furthermore, client system 16 may have a microphone and voice recognition mechanism to receive a user's verbal command or voice input. The system may also have a facial recognition mechanism to recognize a user. In addition, the system may have a gesture detection mechanism to receive a user's gesture instructions. For VR and AR devices and some wearable devices, a virtual screen or a screen with a very small size may be arranged. A virtual screen may be part of a displaying system that doesn't have a physical screen. Since it is impractical or inconvenient to touch a virtual screen or very small screen, a user may use voice instructions and gestures to interact with a system and issue commands.

FIG. 1-C shows that a user 28, who is making a hailing gesture, is detected by vehicle 18 schematically. Vehicle 18 may be a device which moves around autonomously. Examples of vehicle 18 include automobile, robot, drone, flying car, ship, or the like. In descriptions below, an autonomous automobile is used as vehicle 18 to explain principles. The vehicle may have various sensors (not shown) to ascertain the external environment and internal situation. The sensors may include cameras, microphones, a radar system, a light detection and ranging (LIDAR) system, a global position system (GPS), a speed sensor, an accelerometer, an electronic compass, etc. Control system 26 of vehicle 18, like client system 16, may have a computer processor, a storage device, a display device with a touch sensitive screen, a voice recognition mechanism, a facial recognition mechanism, and a gesture detection mechanism. It is noted that voice, facial, and gesture recognition technologies are all mature nowadays. Control system 26 may use the sensors and mechanisms to monitor the environment, detect a user, interact with a user, and receive instructions from a user. Moreover, the control system may calculate a route after receiving a user's hailing request and navigate vehicle 18 to the user along the route. In FIG. 1-C. control system 26 finds and ascertains user 28 via sensors like cameras, radar, and/or LIDAR. It analyzes the user's gestures and determines that the user is waving at vehicle 18.

When a user needs a vehicle and sees one on a street, it is natural and convenient to hail the vehicle with a gesture directly. FIGS. 2-A and 2-B use exemplary diagrams to illustrate a hailing process. In FIG. 2-A, there are three vehicles 30, 32, and 34. Vehicles 32 and 34 have no signs and are running toward opposite directions, while vehicle 30 is parked beside the curb with a vacant sign which indicates it is vacant and available for hailing. A user 36 finds vehicle 30 and starts waving at it. In FIG. 2-B, a control system of vehicle 30 detects that user 36 is waving. It analyzes the user's gestures via certain algorithm and concludes that the user is hailing it. Then the control system sends a hailing message to Service Center and asks for approval. Once getting an approval message from Service Center, the control system calculates a route 56 and drives vehicle 30 to user 36 along the route. Alternatively, the control system may also navigate vehicle 30 to approach user 36 without getting approval from Service Centre. It is noted that the method applies to a vehicle running on a road as well. The control system of vehicle 30 is arranged to provide three options for user 36, i.e., driving user 36 to a destination, receiving a parcel from user 36 and transferring the parcel to a shipping station or a designated vehicle, or driving the user to a destination and receiving a parcel before or during the trip. For example, user 36 may get in vehicle 30 and begins a journey to a place. User 36 may also put a parcel inside vehicle 30 and complete a shipping process. Further, user 36 may get in vehicle 30 and start a process to ship a parcel during a trip to a destination.

Figure 3:
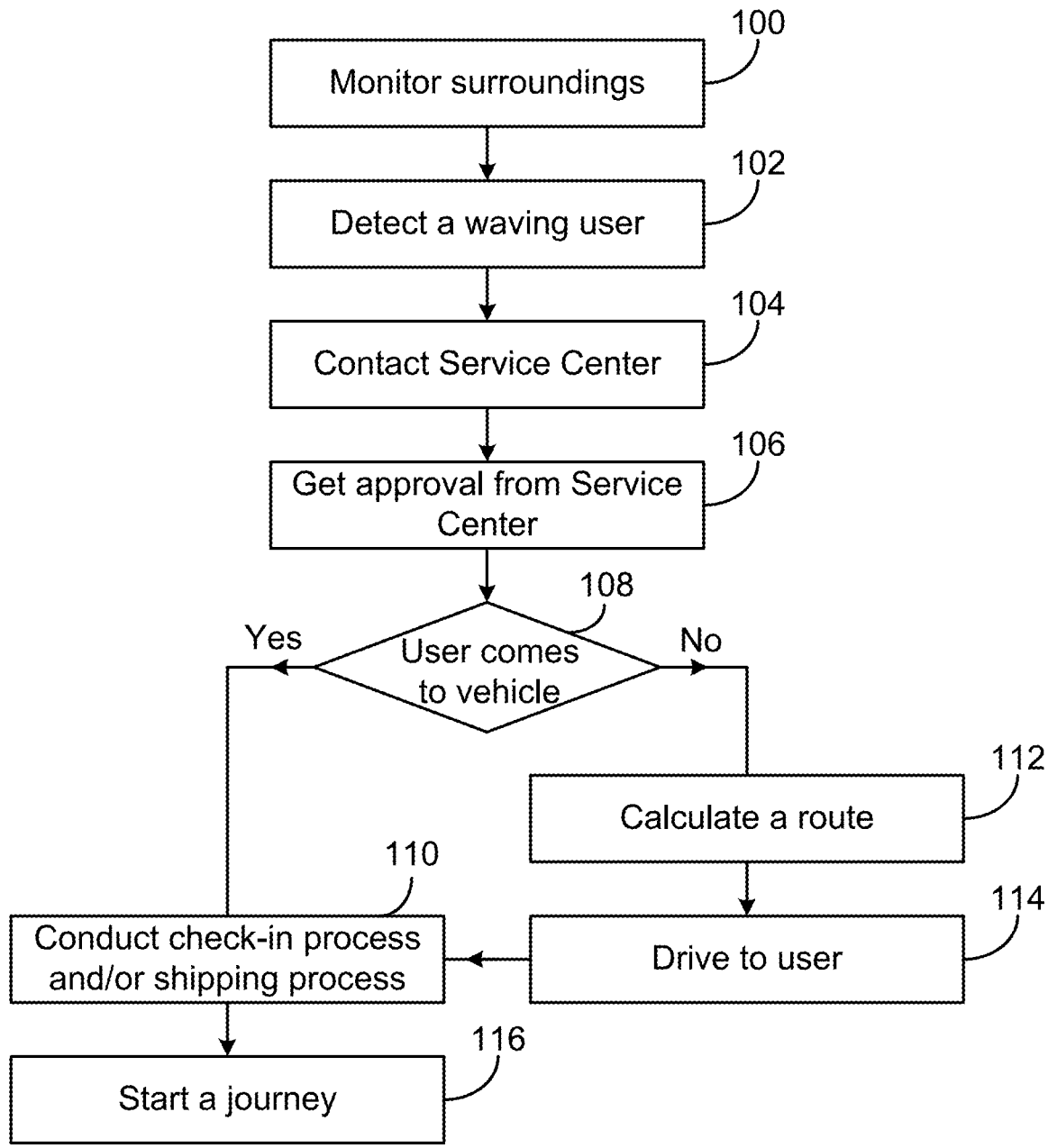
FIG. 3 is an exemplary flow diagram depicting a hailing process in accordance with the present invention.

FIG. 3 shows an exemplary flow diagram which illustrates a hailing/shipping process. The process is arranged to assist a user. A vehicle is in standby mode and displays a vacant sign. The vacant sign may have a word like "Vacant" and is arranged to show the vehicle is available for hailing. A control system of the vehicle monitors its surroundings using cameras and other sensors at step 100. The system finds that a user is waving at the vehicle at step 102. To determine whether a user waves at a vehicle, there may be two conditions. First, the user waves his or her hand. In some embodiments, one or more fingers of the waving hand may stick out. Optionally, the user may wave a fist. In some cases, the palm of the waving hand has to face the vehicle. Second, the user faces the vehicle. If the control system detects that a user waves and faces the vehicle, the two conditions of waving are satisfied at the same time. Then, the system may determine that the user waves at the vehicle. If the system detects that a user waves but does not face the vehicle, the two conditions are not satisfied simultaneously. The system may ignore the waving act. After determining the user is waving at the vehicle, the control system contacts Service Center, sends a hailing message at step 104, and then waits for permission from Service Center. Service Center reviews the hailing message and checks whether the vehicle is assigned to a job already. The center also checks whether there is another vehicle which sends a similar hailing message regarding the same user in a given time period. If the vehicle is not reserved for any assignment and the vehicle is the only one which sends a hailing message within the time period, Service Center sends an approval message to the control system.

After getting approval from Service Center at step 106, the control system continues monitoring the user at step 108. The user may walk to the vehicle or stay put at the same place. If it is detected that the user walks toward the vehicle, the vehicle doesn't need to move and hence it waits for the user at the same spot. If the vehicle is already on the way to approach the user, the vehicle stops moving and waits for the user to come to it. The control system may replace the vacant sign by another sign with a word like "Welcome", when the user walks toward the vehicle. At step 110, the control system provides three options for the user: Getting a ride to a place, shipping a parcel, or a combination thereof. The user may start a check-in process for a ride after getting in the vehicle. If the user wants to ship a parcel, the user may place the parcel inside the vehicle and proceed with shipping procedures. If the user doesn't move toward the vehicle within a predetermined time period, the control system may drive the vehicle to the user. The control system may measure the position of the user and calculate a route to go there at step 112. Next at step 114, the control system starts a motor or engine and navigates the vehicle to approach the user along the route, while replacing the vacant sign by a sign with a word like "Coming". After the vehicle stops in front of the user at step 110, the user may enter the vehicle and check in for a journey, ship a parcel via the vehicle, or check in for a journey and ship a parcel during the trip. At step 116, the control system calculates a route and takes the user and/or a parcel to a place. After the user gets in, the vehicle may display a sign with a word like "Occupied" so that other users know it is not available for hailing.

Sometimes, e.g., during the rush hour, more than one user may wave at a vehicle at the same time. Thus certain rules may be made for cases when multiple users waves simultaneously. For instance, if a user and a vehicle are on the same side of a road while the other user is on the other side, the user on the same side prevails. When multiple users are on the same side of a road, the user who is closer or the closest to the vehicle prevails. For such a purpose, a vehicle may be arranged to monitor and analyze multiple users at the same time.

When more than one vehicle responds to a waving user, the user may use a finger or a hand to point at a vehicle to select it. When a vehicle detects that a user points or waves at another vehicle or object, it will not proceed to pick up the user.

It is noted that systems and methods for hailing a vehicle not only apply to automobiles, but also apply to robots, drones, flying cars, and ships, as they may have similar sensors to ascertain a user and may maneuver to the user autonomously.

Figure 4:
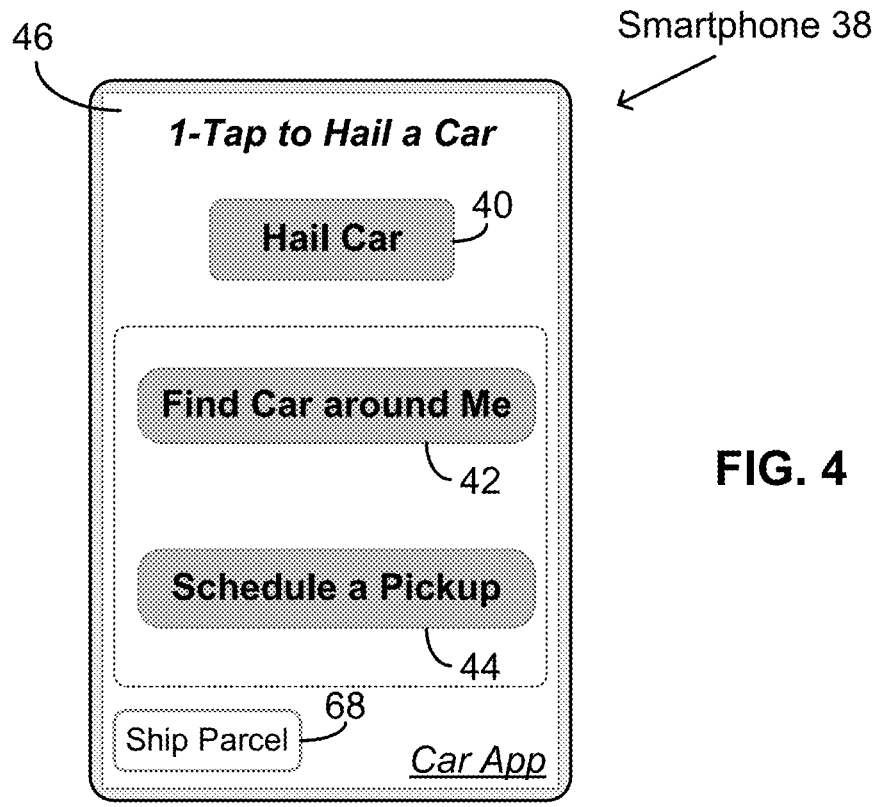
FIGS. 4 and 5 are exemplary diagrams which illustrate interface settings for hailing a vehicle in accordance with the present invention.

A user may gesture at a vehicle when the vehicle is in sight and monitoring the user. But a hailing gesture doesn't work if a vehicle is in sleeping mode with sensors turned off. When a vehicle is in sleeping mode, a user may use an app to contact Service Center and let the center send a message to activate the vehicle. FIG. 4 shows an exemplary diagram of an app interface which a user may use to hail a car or find a car. Assuming that Car App is installed at a smartphone 38. The app may be provided by Service Center for hailing a vehicle, reserving a vehicle, or ship a parcel. As shown in FIG. 4, the app is launched and content of the app interface is shown on a touch-sensitive screen 46. There are schematically four interactive elements or buttons 40, 42, 44, and 68 that represent four options presented to a user. The buttons have exemplary labels such as "Hail Car", "Find Car around Me", "Schedule a Pickup", and "Ship Parcel", respectively. The top portion of the interface is configured for a simple and quick hailing process which requires one action only. The first line shows a title, like a sentence "1-Tap to Hail a Car". Below the title, button 40 is arranged for starting a one-tap-to-hail-a-car process.

The app is designed such that a user may just tap button 40 to complete a vehicle hailing process without submitting a pickup location, pickup time, a destination location, or other information. Assuming that a user has an account at Service Center and enables a location option at phone 38. When the location option is enabled, phone 38 may turn on GPS or use certain positioning mechanism to get its location info. After Car App is launched, an interface like the one in FIG. 4 may appear. Since the phone's location is measured constantly, the app may obtain data of the current location anytime. Once a user taps button 40, it prompts the app to send a message to Service Center. The message may contain at least three items: The user's account number, data of the current location, and a request for hailing a vehicle. Service Center may assume that the user needs a vehicle right now and the pickup place may be the user's current location or a nearby place if the current location is not suitable for pickup. Next Service Center may select and dispatch a vehicle to pick up the user and send a confirmation message to the user in the meantime. The message may show up in the app interface with content such as when a vehicle will come and where a pickup place will be. If the user closes the app after tapping button 40, Service Center may send the user an email or a short message containing similar information.

As a user only needs to tap button 40 after the app is launched, hailing a vehicle may become simple, quick, and convenient. Such a one-tap-to-hail-a-car process especially fits autonomous vehicles. For instance, before a taxi with a driver is dispatched, the driver's work area and work schedule have to be reviewed. Some drivers may not be available for a long trip or a trip to a specific area. On the contrary, autonomous vehicles may not have such limiting factors. They may be treated relatively equal. They may be sent to a user without knowing destination info or without worrying about where the user will go.

When a user wants to schedule a pickup at a later time or at another location, the user may tap button 44. After the button is tapped, a window may appear where related information may be submitted.

When a user wants to ship one or more parcels, the user may tap button 68. After button 68 is tapped, a window may appear to show shipping options. Certain spaces may also be configured in the window for the user to provide information such as a ship-to address and pickup location. Further details about the window with regard to shipping are illustrated in descriptions below.

When a user needs to hail a vehicle, the user may tap button 40 or 44 to hail one. Next, Service Center may dispatch a vehicle to pick up the user. Sometimes when there are available vehicles nearby, a user may want to take a look at the vehicles, compare one with another, and then choose one to hail it. Button 42 is arranged for checking vehicles within a given short distance. When the app senses button 42 is tapped, it sends a message to Service Center. The message contains the user's location info and a request for finding vehicles. The user's account number may or may not be included, depending on the setting or user selection. Next, Service Center receives the message and retrieves vehicle info from database. The center may conduct a search and select vehicles which are parked around the user within a given distance. The given distance may be determined by Service Center and arranged around, for instance, one hundred to two hundred meters. Service Center then sends info about the selected vehicles to the user. The info contains locations of selected vehicles and a map covering areas around the user.

Figure 5:
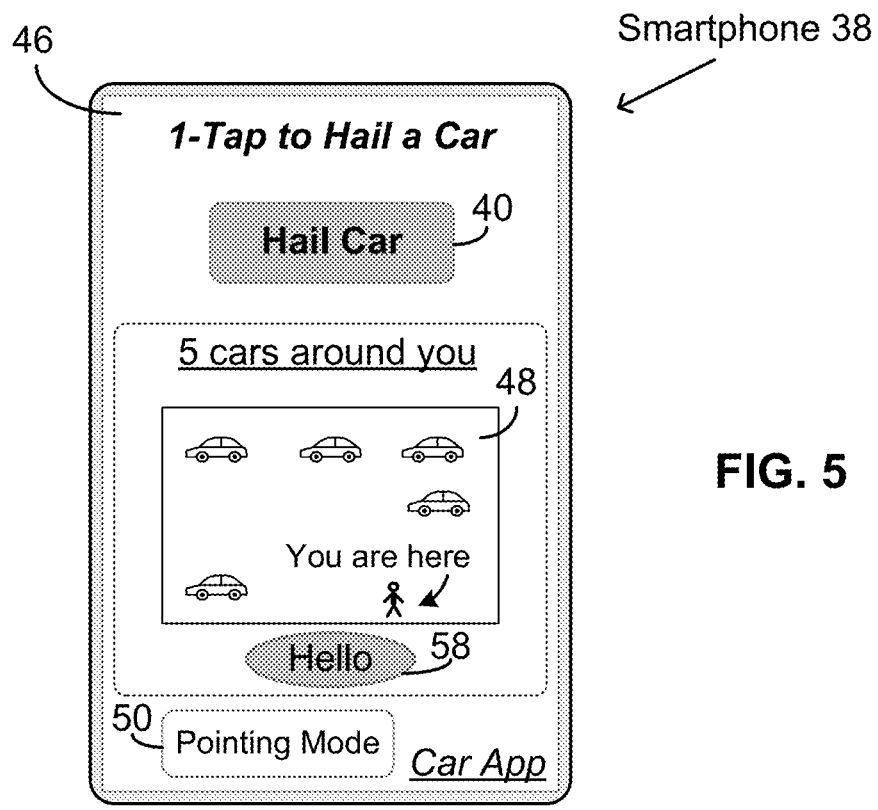

After getting the info from Service Center, the app presents it in the interface, as depicted schematically in FIG. 5. A message "5 cars around you" summarizes the search result. The map is presented in a window 48. There are five vehicle icons representing five vehicles on the map. A user may take a look at the map and then search around to find the vehicles in the surroundings. The five vehicles may be notified by Service Center already and each may show a vacant sign. A button 58 with a label "Hello" is configured beneath the map area. Once button 58 is activated, the app sends a "Hello" message to Service Center. The center then sends a message to vehicles which are shown on the map. After receiving the message, the vehicles may respond by showing a "Hello" signal or sign. The "Hello" signal or sign may be arranged more conspicuous than the vacant sign. It shows that a vehicle is available and ready for hailing. Examples of the "Hello" signal or sign may include flashes of certain light and a word like "Hello", "Available", or "Ready", etc. The "Hello" signal or sign may last for a short period of time, such as around one to three minutes. A user may tap button 58 again to have another survey on nearby vehicles. When the user finds a suitable vehicle, the user may hail it with a gesture or via the app.

Alternatively, a small check box (not shown) may be configured beside each vehicle icon on the map in window 48. A user may check one or more boxes and then tap "Hello" button 58. Then only the checked vehicles, i.e., the vehicles whose boxes are checked, are notified by Service Center. These vehicles may respond by showing the "Hello" signal or sign. Thus, a user may use the check boxes and the "Hello" button to recognize each vehicle individually. For instance, a user may check a box, tap the "Hello" button, and then look around to see which vehicle shows the "Hello" signal or sign. The check box helps a user find and interact with a vehicle conveniently.

The vehicle icons which represent vehicles on the map are arranged interactive. A user may tap a vehicle icon to find info about a vehicle. For instance, a window may show up after a vehicle icon is tapped. The window may provide vehicle info like make, model, year, color, and so on. The window may also present an interactive button "Hail this car". When a user taps "Hail this car" button, the app sends a message to Service Center. The message may indicate that the user has selected the vehicle and wants to hail it. Next, Service Center may approve the request and assign the vehicle to the user. The center may send a message to the user to confirm the hailing result and send another message to notify the vehicle.

Since button 40 remains valid in the app interface, a user may tap it anytime to do a quick hailing process. It is noted that tapping button 40 means a user asks Service Center to choose a vehicle. Service Center may select a vehicle around the user or from another place.

Although positions of available vehicles are displayed on a map, such as the map in window 48, some users may still find it hard to know where the vehicles are located in the real world. The problem is that a traditional map shows locations in all directions and it is not intuitive to match a place on a map to a place in front of a user. In order to overcome difficulties to figure out a vehicle's real location, a button 50 is arranged. The button, having a label such as "Pointing Mode", is used to present an elongated map in the interface.

Figure 6:
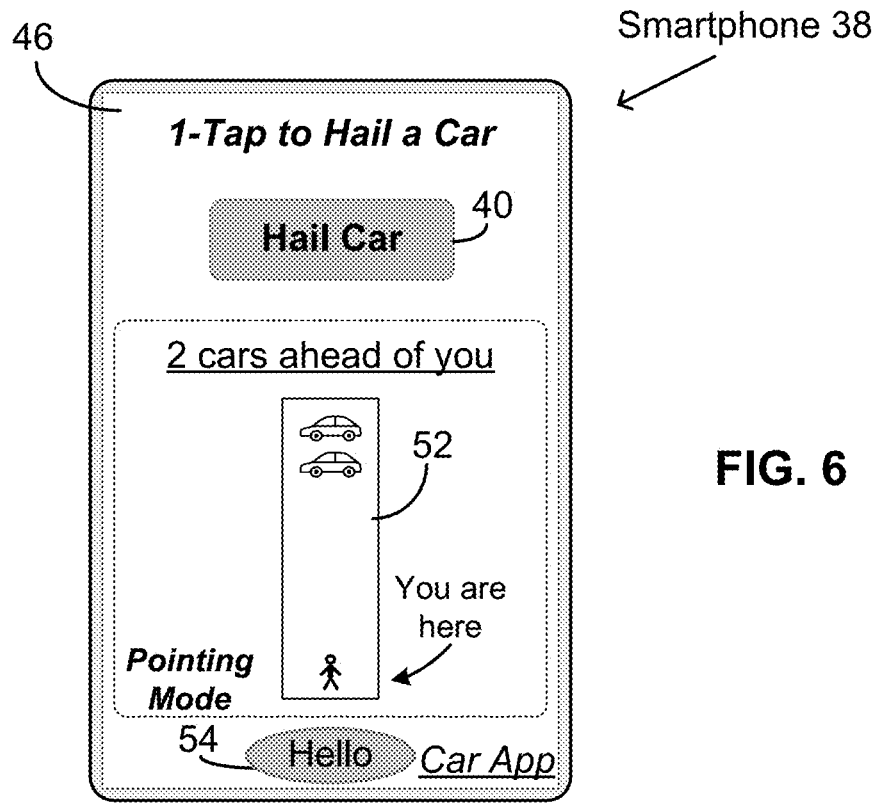
FIGS. 6 and 7 are exemplary diagrams which illustrate interface settings for finding vehicles in pointing mode in accordance with the present invention.

After sensing button 50 is tapped, the app removes window 48 and replaces it with a window 52, as illustrated schematically in FIG. 6. Window 52 shows an elongated map. A message "2 cars ahead of you" tells a user that there are two vehicles in a forward direction. Another message "Point Mode" is used to remind a user that the map is in pointing mode. "Pointing mode" as used herein means a map has an elongated shape and is elongated along the phone's pointing direction. When a screen of a smartphone or smart watch is in a horizontal plane, the pointing direction is what its front end faces at. When the screen is in a vertical plane, the pointing direction is what the screen's back faces at. As the map in window 52 is narrow, it may be arranged to display available vehicles only in front of a user or only in a forward direction and still within a short given distance. When there are two vehicle icons on the map, it means there are two vehicles in the pointing direction of phone 38. Hence confusion about which direction a vehicle is located in may be overcome, since the direction is what the phone points at. It is noted that the pointing mode needs orientation data of a device. Thus orientation capability should be enabled at a device to support the pointing mode. Orientation data may be obtained by an electronic compass installed at phone 38.

Similar to button 58, a "Hello" button 54 is configured on screen 46 of FIG. 6. A user may tap button 54 to send a "Hello" message to Service Center. The center then sends messages to the two vehicles and requests them to show a response like the "Hello" signal or sign.

Figure 7:
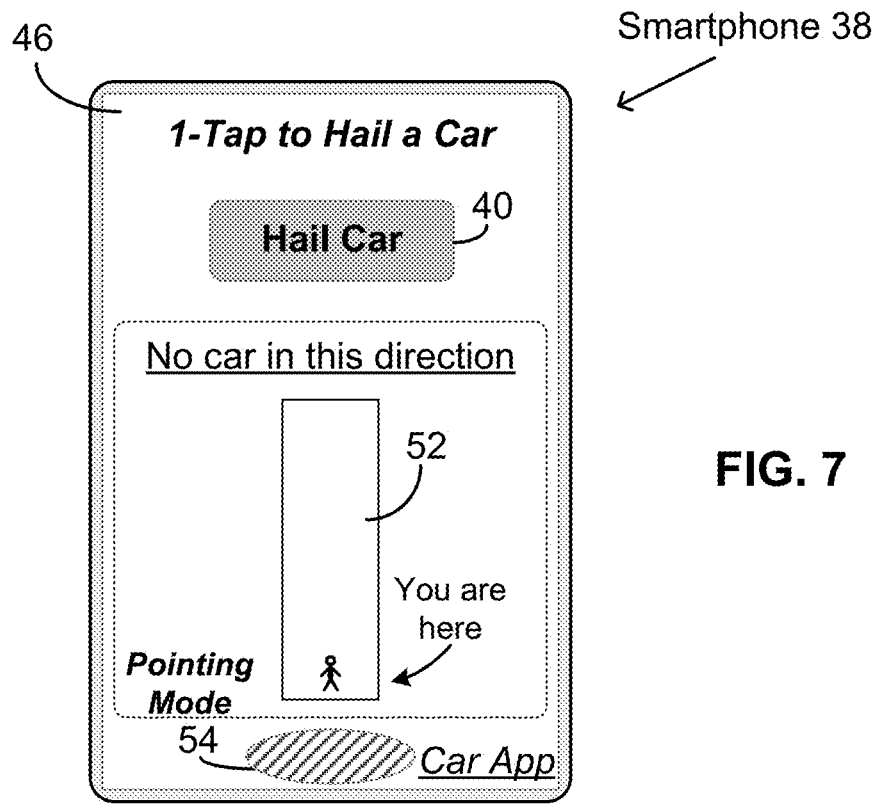

In addition, the user may also points phone 38 at different directions to check vehicle availability elsewhere. FIG. 7 depicts a scenario when there is no available vehicle along a pointing direction. Correspondingly, there is no vehicle icon on the elongated map in window 52. In this case, button 54 may be configured to appear, for example, blank with a decreased brightness level.

Returning to FIG. 4. When a user wants to find vehicles around him or her, the user may tap button 42. After that, the app sends a search request to Service Center. The request also contains location data of the user. The center then searches available vehicles nearby. Next, the center sends to the user location info of selected vehicles and a map which covers a given short distance from the user. In the meantime, the center sends wake-up messages to the selected vehicles which appear on the map.

Figure 8:
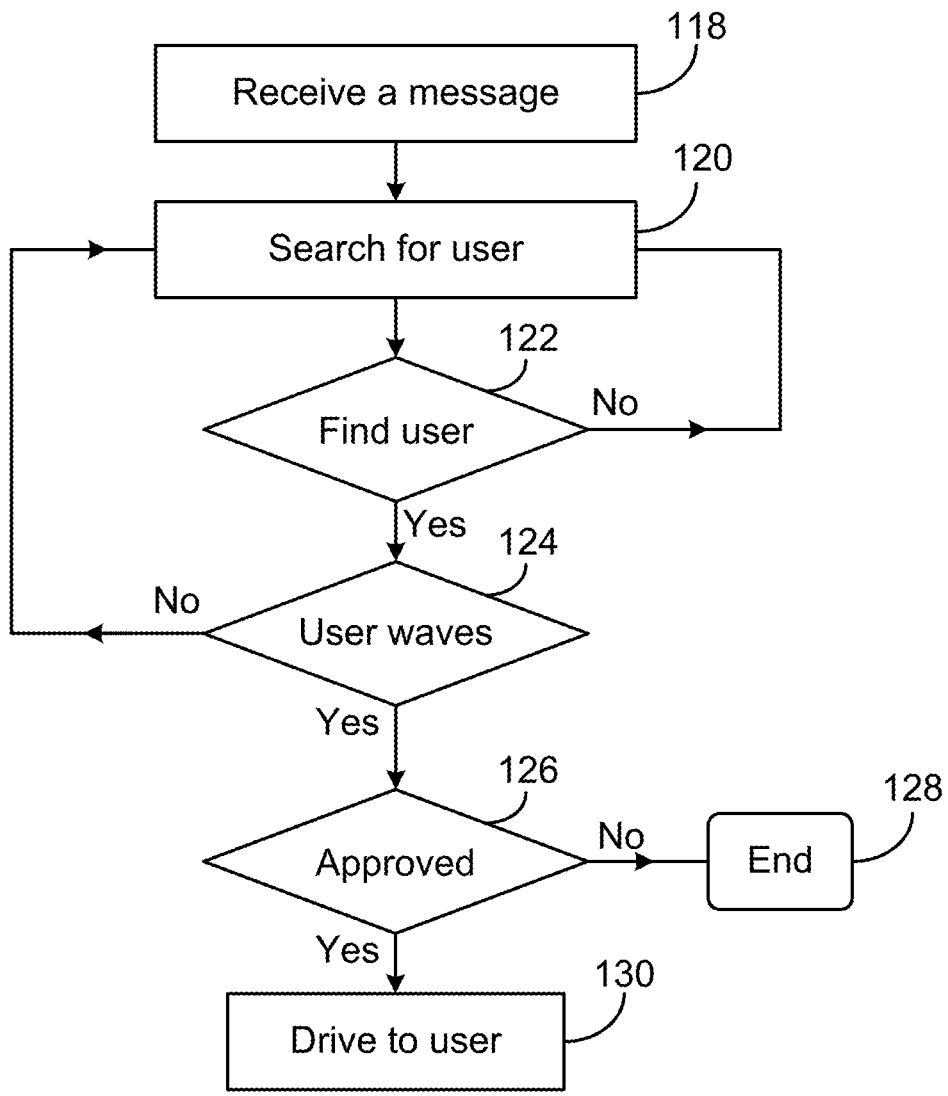
FIGS. 8 and 9 are exemplary flow diagrams depicting hailing processes in accordance with the present invention.

After a vehicle receives a wake-up message from Service Center, it starts a process to engage a user. FIG. 8 shows an exemplary flow diagram for such an event. At step 118, a vehicle receives a wake-up message from Service Center. Next, the vehicle begins searching for a user who may want to hail a vehicle for a trip or shipping a parcel at step 120. The vehicle may already have a vacant sign to show it's available. If not, it displays the sign to notify people around it. As Service Center has location data of the user, it passes the info to the vehicle so that the vehicle knows where the user might be. Resultantly, the vehicle may ignore users from other areas. Thus interference, misunderstanding, and misrepresentation may be reduced.

Sometimes the vehicle may not find the user immediately, as the user may be blocked by an object, e.g., a building or another vehicle. If a search has no result at step 122, step 120 is taken again and the search continues. When the vehicle finds the user at step 122, it ascertains whether the user waves at it at step 124. If the user doesn't wave at the vehicle within a given time period, it may mean the user may not be the person who wants to hail a vehicle. Then the vehicle returns to step 120 and starts another search. If it is detected that the user waves at the vehicle at step 124, the vehicle sends a hailing message to Service Center, asks for approval at step 126, and then wait for a response from Service Center. Once receiving an approval message, the vehicle calculates a route and drives to the user at step 130. If it is not approved, the process ends at step 128. As aforementioned, Service Center may use the approval process to verify that the vehicle is not reserved for another task. The approval process is also useful when multiple vehicles each determine a user is waving at it. As a user may gesture from a distance, it may be difficult to tell which vehicle the user aims at. Then Service Center may receive hailing requests from several vehicles within a given time frame, say one to five seconds. The center may select a vehicle based on certain rules. For instance, the center may pick a vehicle which is the closest to the user and assign it to take the task. Alternatively, the center may select a vehicle which is the first to submit a hailing request.

In addition, the vehicle may ascertain whether the user walks toward it at step 124. If the user waves or raises hand and then walks to the vehicle, the vehicle may stay there waiting for the user to come, or stop moving to the user and park at a spot to await the user.

After the user and vehicle meet at step 130, three options are provided for the user by the vehicle. If the user wants a ride to a place, the vehicle starts a journey after certain check-in procedures. If the user wants to ship a parcel, the vehicle receives the parcel from the user, performs shipping procedures, and prints out a receipt for the user. If the user wants to do both, the vehicle accepts the parcel before or during the journey, goes through shipping steps, and drives the user to a destination.

Figure 9:
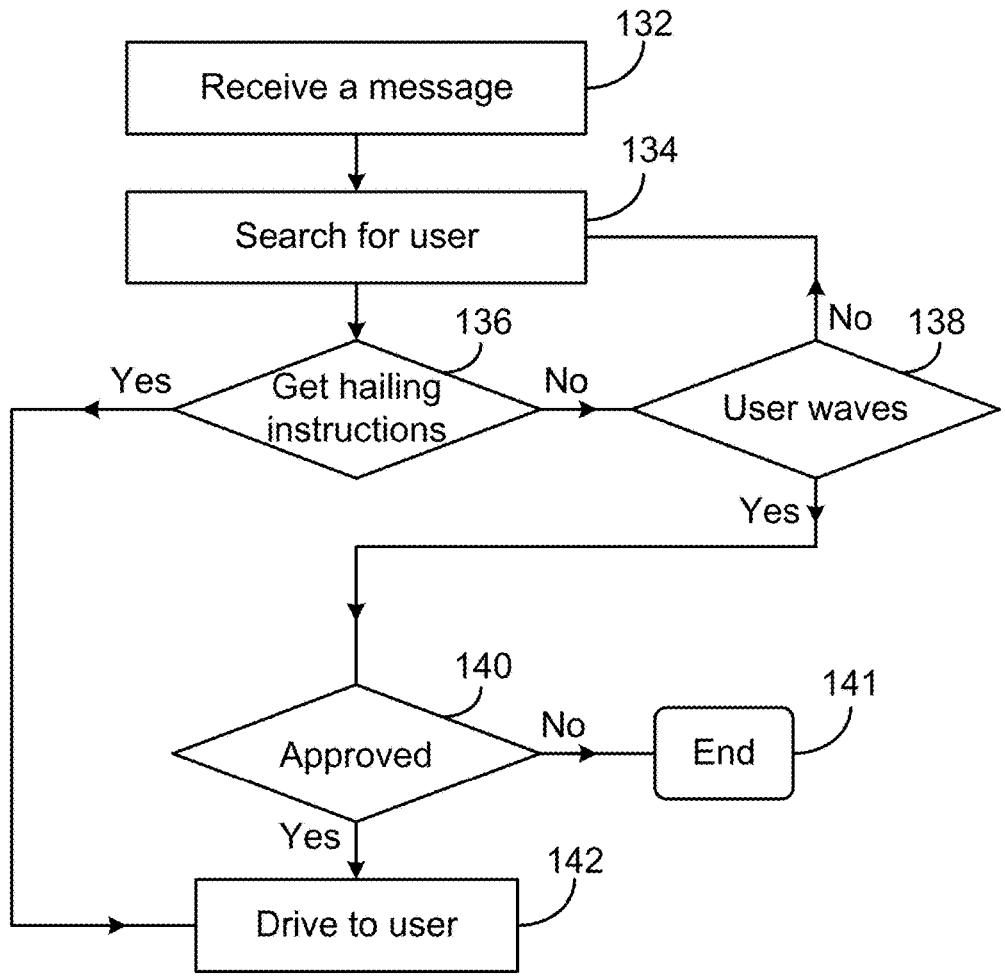

FIG. 9 shows another exemplary flow diagram of a hailing process. A vehicle receives a wake-up message from Service Center at step 132. As aforementioned, after a user launches an app at a user device and requests a vehicle search at Service Center, the center sends wake-up messages to selected vehicles which are within a given short distance from the user. One of the selected vehicles starts a process to find the user at step 134. The vehicle may already have a vacant sign to show it's available. If not, it displays the sign to notify the public. Meanwhile, Service Center also sends relevant vehicle info to the user. An app interface like that of FIG. 5 may show up at the user device. Vehicle icons representing available vehicles within the short distance are displayed.

At step 136, the vehicle monitors messages from Service Center. One of the messages may contain hailing instructions. For instance, a user may tap a vehicle icon in the interface, like the icons in window 48 or 52 of FIG. 5 or 6. After the app detects that a vehicle icon is tapped, it presents a new window. The window may show info of the vehicle and a "Hail this car" button. Then the user taps the "Hail this car" button to reserve the vehicle. In response to activation of the button, the app contacts Service Center and passes the selection info. Service Center then assigns the vehicle to the user and sends hailing instructions to the vehicle. After the vehicle receives the hailing instructions, it drives to the user autonomously at step 142 and picks up the user or receives a parcel from the user.

If the vehicle doesn't receive any hailing instructions at step 136, it searches for the user or detects whether any hailing gestures are made when the user is found at step 138. If the user is not found or hailing gestures are not observed for a given period of time, the vehicle returns to step 134 to start another round. If hailing gestures are detected at step 138, the vehicle sends a hailing message to Service Center. At step 140, if the vehicle gets a disapproval message from the center, the hailing process ends at step 141. If the vehicle receives approval from the center, it drives to the user autonomously at step 142 and picks up the user. If the user has a parcel to ship, the user may utter a voice command such as "Ship parcel" to the vehicle. Then, the vehicle receives the parcel from the user and performs shipping procedures.

Figure 10:
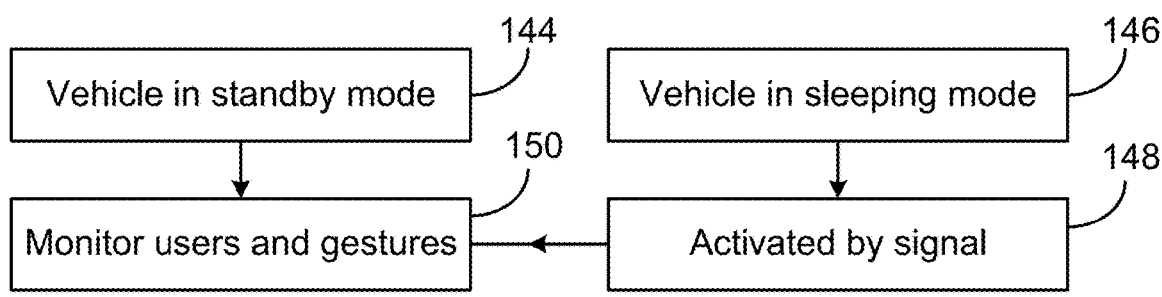
FIG. 10 is an exemplary flow diagram depicting vehicle activities in accordance with the present invention.

FIG. 10 shows an exemplary flow diagram which depicts vehicle activities according to the present invention. When a vehicle is free of any assignment and sits beside the curb of a road or at a parking lot, it may have two modes. At step 144, a vehicle is in standby mode with a vacant sign displayed. The vehicle's engine or motor is turned off, while the sensors which monitor the external environment are still on. The vehicle is arranged to monitor nearby users, ascertain them, and detect their gestures at step 150. If a user waves at the vehicle, a control system of the vehicle may analyze it, determine the meaning of it, and drives to the user autonomously after getting approval from Service Center. Alternatively, if the approval is not required in some cases, the vehicle may drive to a waving user without first contacting Service Center.

Sometimes, a vehicle may rest in sleeping mode as shown at step 146. When a vehicle is in sleeping mode, the engine (or motor) and most sensors may be power off. The vehicle may display a sign such as "Out of service". The vehicle doesn't monitor its surroundings or detect a user's gestures. The sleeping mode may be interrupted by a signal from Service Center at step 148. After the vehicle receives a wake-up signal or wake-up message from Service Center, it turns on the sensors and displays a vacant sign. The vehicle then starts monitoring users in the surroundings at step 150. Hence, a user may gesture to hail a vehicle in standby mode, but it may not work if the vehicle is in sleeping mode. A vehicle in sleeping mode may be activated by Service Center, which may happen after the center receives a search request from a user.

Figure 11:
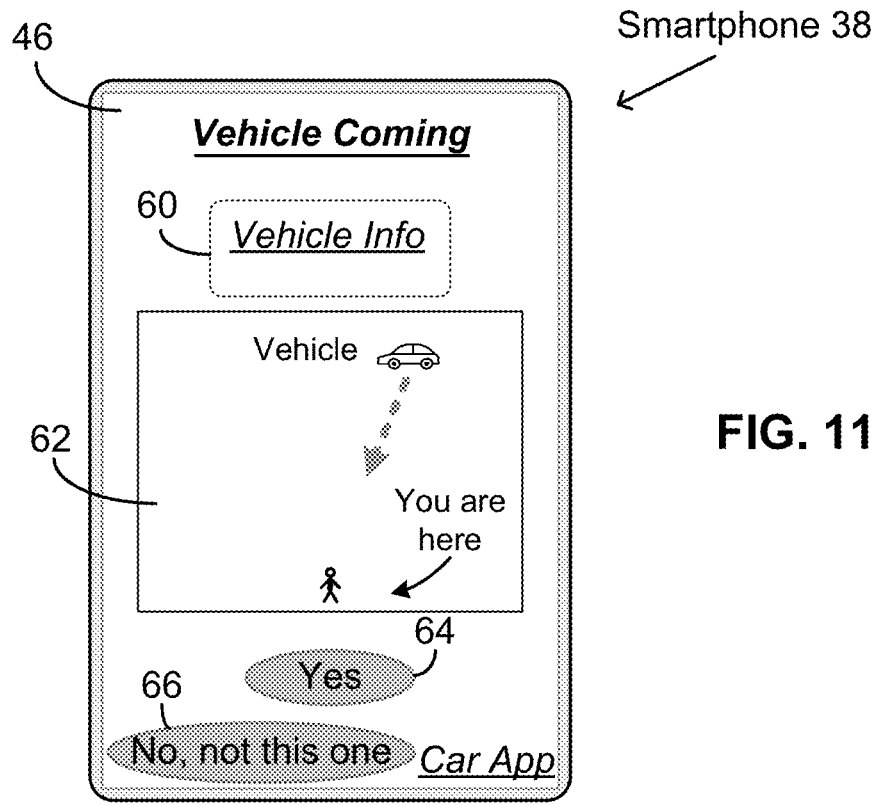
FIGS. 11 and 12 are exemplary diagrams showing hailing processes in accordance with the present invention.

FIG. 11 shows an exemplary app interface which reflects a scenario after a user hails a vehicle according to the present invention. The vehicle may be hailed via a gesture or tapping a button as aforementioned. A message "Vehicle Coming" is displayed in the top portion of the screen, which assures the user that the vehicle is coming to him or her. A window 60 may show the make, model, year, color of the vehicle and other info. A map in a window 62 may show the real-time position of the vehicle and the user. Location info of the vehicle may come from Service Center, which gets it from the vehicle. The user may tap a "Yes" button 64 to verify the hailing result. If the user doesn't tap button 64, it would not matter. If the user finds a wrong vehicle is selected, the user may tap a button 66 with a label such as "No, not this one" to cancel the selection. After button 66 is tapped, the app may notify Service Center and present other available vehicles on the map. Then the user may tap an icon of another vehicle to select it. The user may also gestures at another vehicle to hail it, as illustrated above. The newly selected vehicle may appear moving on the map as it approaches the user.

Figure 12:
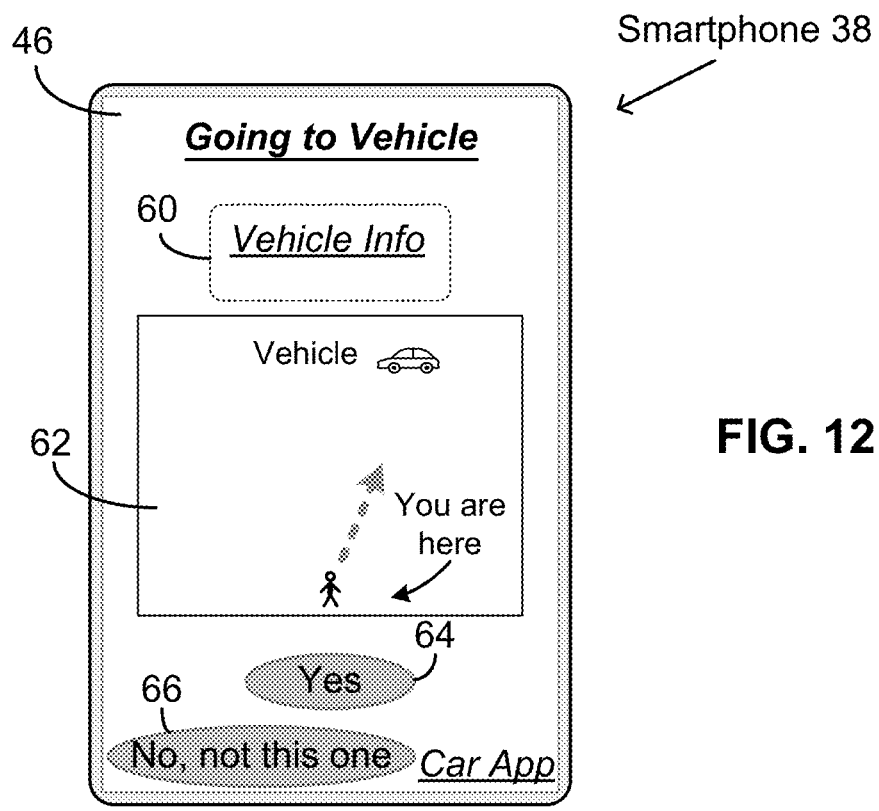

If the user walks to the vehicle after hailing it, the vehicle may detect the action and report it to Service Center. Service Center then sends a message to the app. Alternatively, the app may detect that the user moves toward the vehicle according to location data of the user and the vehicle that is continuously updated. Then the app may pass the info to Service Center. Thereafter, the app may present another interface, which is depicted exemplarily in FIG. 12. A message in the interface says "Going to Vehicle", confirming that the user is going to the vehicle. Overall, FIG. 12 resembles FIG. 11. Information about the vehicle is presented in window 60. The map in window 62 may show that the user moves toward the vehicle in real time, while the vehicle stays put. Similarly, buttons 64 and 66 are arranged for the user to verify the hailing act or cancel it.

Figure 13:
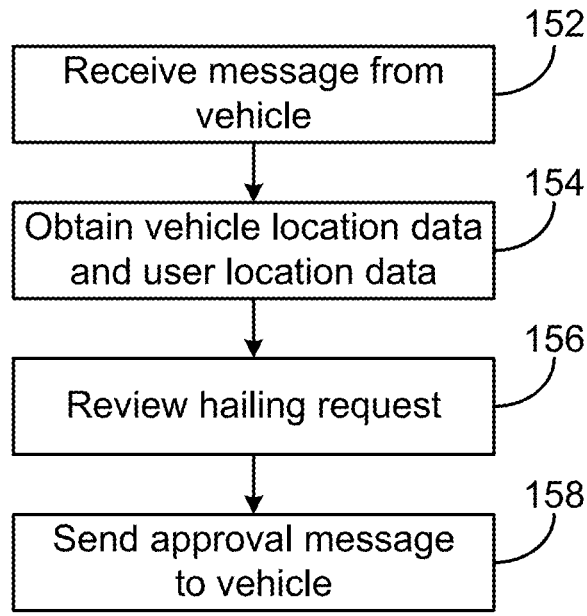
FIGS. 13 and 14 are exemplary flow diagrams describing hailing processes in accordance with the present invention.

After detecting a user's hailing gestures, a vehicle may drive to the user directly or wait for approval from Service Center before approaching the user. Both methods have merits. The former is easy to implement, while the latter may improve user experience as it prevents confusion and awkwardness caused by multiple vehicles going to the same user. FIG. 13 shows an exemplary flow diagram which describes a hailing process supervised by Service Center. At step 152, Service Center receives a hailing message from a vehicle. The message is sent after the vehicle detects that a user makes a hailing gesture at it. The user may want to go to a place and/or ship a parcel. The center checks content of the message. At step 154, the center obtains from the message location data of the vehicle, location data of the user, and info about the gestures which are considered as a hailing request. Location data of the user is acquired by the vehicle via measurements using sensors (e.g., cameras and LIDAR). The center may also obtain from the message images of the user which are taken by the vehicle.

At step 156, Service Center reviews the hailing case. Based on location info of the user, or the location info plus images of the user, the center checks how many vehicles send a hailing message about the same user. When a user is at a distance while some vehicles are relatively close to each other, the vehicles may receive the same gesture signals from the user. Thus more than one vehicle may detect the same hailing gestures. When Service Center receives a hailing message from only one vehicle within a given time period, the vehicle may be selected. When Service Center receives hailing messages from multiple vehicles within the given time period, the center may select one based on predetermined rules. For instance, the center may obtain a distance between a vehicle and the user by, for example, calculation based on the location info. A vehicle which is the closest to the user may be selected. Alternatively, the center may also select a vehicle which is the first to send a hailing message. In addition, the center may check whether a vehicle is reserved already and remove the vehicle if it is assigned to another task. At step 158, a vehicle is chosen and assigned to the user after the reviewing process. The center then sends an approval message to the vehicle. Depending on the needs of the user, the vehicle may drive the user to a destination or receive a parcel and take shipping instructions from the user. The method applies to vehicles sitting at a place or running on a road. When the vehicles are parked, the given time period may be one to five seconds. When the vehicles are running, the given time period may be one to two seconds or shorter.

Figure 14:
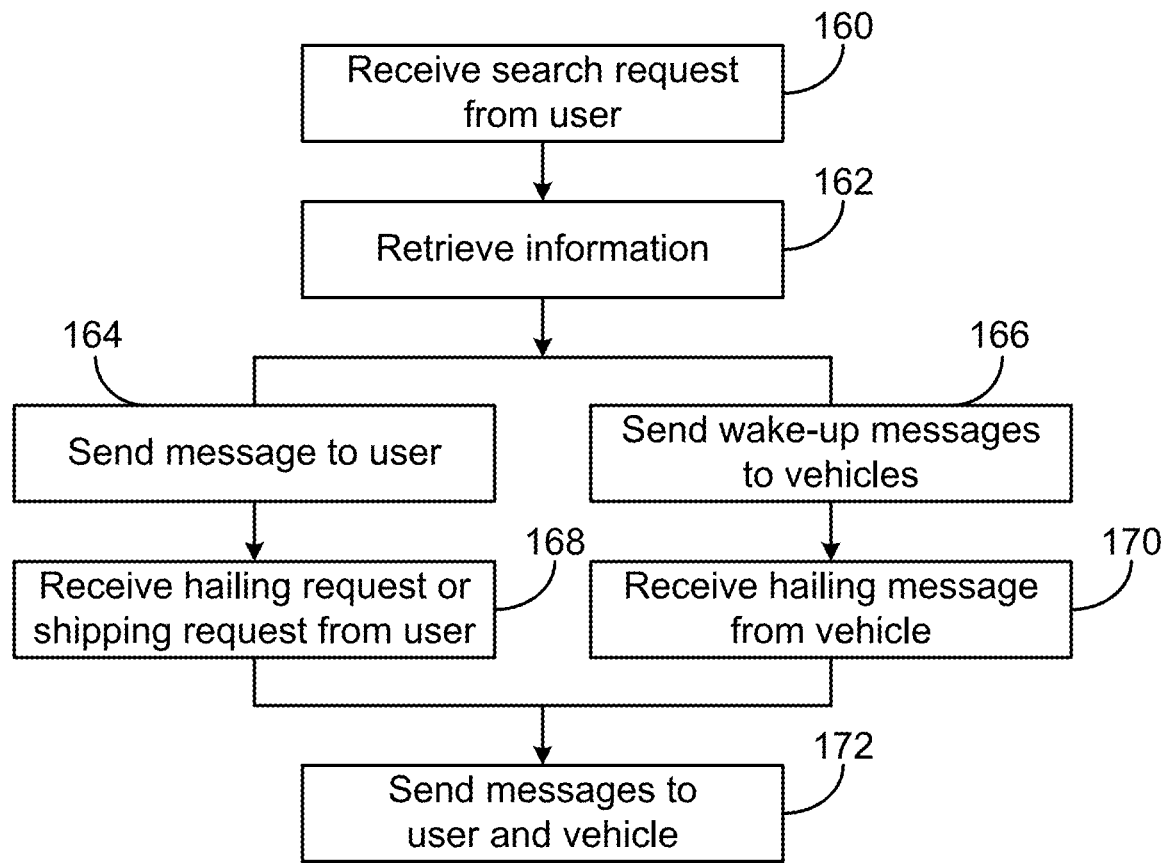

FIG. 14 shows another exemplary flow diagram about a hailing process supervised by Service Center. The process helps a user hail a vehicle for a ride to a pace or shipping a parcel. At step 160, Service Center receives a vehicle search request from a user. The request is sent after the user launches an app (e.g., the Car App) at a user device and submits a search request, like tapping button 42 of FIG. 4. As aforementioned, location data of the user is also sent to the center with the search request. At step 162, the center finds suitable vehicles around the user within a given distance and retrieves info of the selected vehicles from database. At step 164, the center sends the vehicle info to the user. Once the user device obtains the vehicle info, it presents a map in the app interface, where locations of the selected vehicles are displayed. At step 168, Service Center receives a hailing request and/or shipping request from the user. As discussed, the user may tap a vehicle icon on the map and proceed to hail the vehicle. The center may review the request, approve it, and send messages to the user and the chosen vehicle respectively at step 172. The message to the user confirms the hailing act. The message to the vehicle contains location data of the user and instructions for the vehicle to find and engage the user. Thereafter, the user may submit a command to the vehicle, such as uttering a voice command or tapping a button on a touch screen, and ask the vehicle to go to a place or start a shipping process to ship a parcel.

After receiving a search request from the user, Service Center also sends messages or wake-up messages to the selected vehicles at step 166. When a vehicle is in standby mode, the message serves as a notification. When a vehicle is in sleeping mode, the message works as a trigger or an activation command besides a notification. As illustrated above, the selected vehicles may search for the user and display vacant signs to show they are available. Once a vehicle detects that the user gestures at it, it sends a hailing message to Service Center. The center may receive the hailing message from one or more vehicles at step 170. The center then reviews the hailing case, chooses a vehicle based on certain selection rules when multiple vehicles are involved, and assigns the vehicle to the user. As aforementioned, the center may select a vehicle based on vehicle-user distance or message-sending time. The center may also select a vehicle based the preference of the user, such as the make or size of a vehicle. At step 172, Service Center sends a confirmation message to the user, and transmits instructions to the assigned vehicle. After the user meets the vehicle, the user gets in it and starts a journey to a destination. If the user wants to ship a parcel, the user puts the parcel inside the vehicle and proceeds with a parcel-shipping process.

FIG. 15 is an exemplary diagram illustrating various processes to ship a parcel according to the present invention. Referring to FIG. 4, after detecting that button 68 is activated (e.g., by tapping), the app (e.g., the Car App) provides an interface for shipping parcels. Content items related to shipping are presented on screen 46, as shown in FIG. 15. A title shows a subject of the new page, such as "Ship Parcel". A space 70 is configured for a user to enter a ship-to address (or delivery address) for a parcel, which is where the parcel is sent to (or delivered to). The user may determine a parcel pickup option among multiple options provided by the app. For example, a parcel may be picked up by the roadside, in a hailed vehicle, or at an address (e.g., at home or in the workplace).

Referring to FIG. 15, the name and address of a recipient may be entered in space 70 by the user. If the user wants to give a parcel to a vehicle beside the curb of a road, at a parking lot, in a driveway, or at a spot where a vehicle can stop or stay temporarily, the user may check a checkbox 72 or input certain information in a space 74. When checkbox 72 is selected, it indicates that the user chooses the current location (e.g., a location beside the curb) as the pickup location. If the user does not select checkbox 72, but enters an address or a name of a place in space 74, a roadside spot close to the address or place may be considered as the pickup place for a parcel. Optionally, a checkbox 76 may be arranged in the app interface that represents an option for parcel pickup when a user is inside a hailed vehicle. For example, when a user wants to hail a vehicle to go to a place and ship a parcel at the same time, the user may check or select checkbox 76, carry a parcel when hailing a vehicle, and pass the parcel to a hailed vehicle after checking in the hailed vehicle.

Further, a button 84 may be arranged in the app interface for a user to select a shipping method, such as same-day service, overnight service, ground service, etc. The shipping method may also include a service that starts a trip to go to a local ship-to address within a short time (e.g., 10 minutes to 30 minutes) after receiving a parcel. More spaces (not shown) may also be configured in the app interface where a user may enter a ship-from address (e.g., the user's home address) and information about a parcel, such as the weight and dimensions.

After a user submits certain shipping information via the app interface, the user may activate a "Ship Now" button 78, a "Ship Later" button 80, or a "Ship after Hailing Car" button 82. Activation of button 78 indicates that the user requests a vehicle to pick up a parcel at the current time. Activation of button 80 indicates that the user wants to set up a schedule for parcel pickup at a later time. For example, a small window may appear for the user to select a time slot for parcel pickup. Activation of button 82 indicates that the user requests pickup of a parcel when the user is with a hailed vehicle for a ride, which may happen after the user hails a vehicle now or later. As such, tapping button 82 also means that checkbox 76 is selected.

In response to detecting that button 78 is activated, the app sends Service Center a shipping request message. After receiving the shipping request, Service Center finds a vehicle, dispatches the vehicle to the user to pick up the parcel, and sends a confirmation message to the user via the app, in a manner similar to that when a vehicle hailing request is received. The app may display the confirmation message on screen 46 after obtaining it from Service Center.

In response to detecting that button 80 is activated, the app sends Service Center a shipping request message that contains a pickup time provided by the user. After receiving the shipping request, Service Center stores the information, makes certain arrangements with respect to an account of the user, and sends a confirmation message to the user via the app. The app may display the confirmation message on screen 46 after obtaining it from Service Center. For example, Service Center may assign a vehicle to pick up a parcel at a location selected by the user at the scheduled time.

When the app detects that button 82 is activated, the app sends Service Center a shipping request message that has a vehicle hailing condition. In response to reception of the shipping request, Service Center sends the user a confirmation message, which may be displayed at smartphone 38 by the app. The confirmation message may contain certain shipping info the user submitted and remind the user a parcel will be picked up when the user gets in a hailed vehicle for a ride. In the meantime, Service Center may keep the shipping request of the user and wait for the user to hail a vehicle. The user is expected to carry a parcel when hailing for a ride now or later.

Optionally, a user may also activate button 78, 80, or 82 without submitting any shipping information, e.g., via spaces 70 and 74 and checkbox 72. In these cases, relevant shipping info will be collected by a vehicle when the vehicle meets the user. If the app detects that button 78, 80, or 82 is activated but the user does not submit any shipping information, the app sends a shipping request to Service Center. The shipping request may contain info about the user and an account number of the user. As the user does not give any shipping information, Service Center may consider the user's current location is the pickup location if button 78 is activated, send a confirmation message to the user, and then dispatch a vehicle to the user's current location for parcel pickup. The app may display the confirmation message on screen 46 after receiving it from Service Center. If button 80 is selected by the user, Service Center may send the user a note asking the user to provide further info (e.g., parcel pickup time and location) when it becomes available. If button 82 is activated, meaning the user wants to ship a parcel when hailing a vehicle now or at a later time, Service Center may send a confirmation message to the user. The app may show the confirmation message on screen 46, which confirms that a parcel will be picked up when the user hails a vehicle for a ride now or later.

As another option, the user may also input a street address (e.g., a home address) as the pickup place in a space 86 and schedule a time for picking up a parcel. Hence, at least three options are provided for parcel pickup via the app interface.

As illustrated above, after a user taps button 78, 80, or 82, the user may receive a confirmation message from Service Center. If the user already provides sufficient shipping information for a parcel, the app may create one or more shipping labels and asks the user to print out the labels and attach them to the parcel. In some cases, shipping labels made by users are temporary and will be replaced and covered by formal labels printed at a vehicle. In some other cases, shipping labels made by users are formal and will be used to deliver parcels after a checking and verification process conducted by the app or Service Center.

After a user selects checkbox 72 and taps button 78, the app may show a confirmation message sent from Service Center on screen 46. The confirmation message may contain information such as when a vehicle will arrive at the current location of the user and a brief description of the vehicle.

After the vehicle comes, the user approaches it, opens a door, and utters "Ship parcel" as a shipping request to start a parcel pickup process. Optionally, a touch-sensitive display of the vehicle may show interactive buttons with labels such as "Go to a place" and "Ship parcel", which represent two requests or commands (i.e., for a ride and parcel shipping), respectively. The display may be placed inside the vehicle or on the exterior side of the door. The user may tap the "Go to a place" button to ask for a ride to a destination, or tap the "Ship parcel" button to ship a parcel. If the user wants the vehicle to perform both of the tasks, the user may tap the two buttons within a short time period or utter two verbal requests such as "Need a ride and parcel service".

As the weight and dimensions of a parcel are needed for shipping, a vehicle may have a weighing device (e.g., a weighing balance) and another measurement device that detects the size of a parcel. The vehicle may also have a scanning device to scan a parcel and read a label on the parcel to obtain info such as a ship-to address and ship-from address. If a user has submitted certain shipping info using the app, the user may open the app at a mobile device (e.g., a smartphone or smart watch) and let the app contact the control system of the vehicle. Then the control system may retrieve relevant info from the app or use the user's account info to get relevant data from Service Center. Alternatively, the user may enter certain shipping information using a keyboard or touch screen of the vehicle. If the parcel needs a shipping label, the control system may print out the shipping label using a printer installed at the vehicle. The vehicle may have a device that attaches the printed shipping label on the parcel. The user may pay for the shipping fees through an account at Service Center, or use cash or a credit card. The user may put the parcel in a compartment of the vehicle or a designated place (e.g., at the trunk).

If the user selects checkboxes 72 and 76 and taps button 78, it indicates that the current location is the parcel pickup location and the user needs a ride to go to a place now. Then, Service Center may dispatch a vehicle to pick up the user and receive a parcel. When a vehicle arrives, the user approaches it and checks in via a control system of the vehicle. The control system retrieves relevant hailing and shipping info from Service Center. The user may hand the parcel to the vehicle and finish shipping procedures before or during the trip. The control system measures the weight and dimensions of the parcel after receiving it, attaches a shipping label on the parcel, and then prints out a shipping receipt.

Vehicles as used herein include multiple types. A dual-use vehicle may carry a user for a ride, receive a parcel, and provide shipping service. A passenger-only vehicle may carry a user but may not have the capacity to receive a parcel and do shipping procedures. A cargo-only vehicle may receive a parcel and perform shipping service, but may not carry a user for a ride. The term "shipping service" as used herein indicates a type of service that assists people to ship a parcel. Shipping service provided by a vehicle may include one or more actions such as receiving a parcel from a user, measuring the weight and dimensions of a parcel, scanning a parcel to read addresses a user wrote or labels a user puts on a parcel, generating shipping labels, and printing a receipt. When a user just wants to ship a parcel, Service Center may send a cargo-only or dual-use vehicle to get the parcel and perform shipping service. When a user needs a ride to a place and to ship a parcel at the same time, Service Center may dispatch a dual-use vehicle to pick up the user and take the parcel. Alternatively, Service Center may also send the user a cargo-only vehicle and a passenger-only vehicle, respectively. The user may ship the parcel via the cargo-only vehicle, and then gets in the passenger-only vehicle to go to a place. In some cases, Service Center may also take the user to a destination in a passenger-only vehicle, and sends a cargo-only vehicle to meet the user during or after the trip and then picks up the parcel there.

FIGS. 16-A and 16-B are schematic diagrams illustrating a parcel compartment according to the present invention. As depicted in FIG. 16-A, a parcel compartment door 88 is configured inside a vehicle (not shown). Assuming a user selects in-vehicle parcel pickup. During the ride, the user utters a command such as "Ship parcel" or taps a designated button for shipping. A control system of the vehicle detects the voice command (or activation of the designated button) and starts shipping procedures. The user slides door 88 along a pair of tracks 90 to open it. Then, a parcel compartment 92 appears. Parcel compartment 92 is configured in a space behind door 88. Multiple sensors and devices may be installed in the space to assist parcel shipment. The sensors and devices may be connected to and operated by the control system. The user places a parcel 94 in the compartment, as shown in FIG. 16-B. The parcel is put on a weighing device 96 (e.g., a weighing balance) that measures the parcel weight. Further, a device such as an optical device may be installed in the space to measure dimensions of the parcel. For example, the optical device may emit a laser beam to illuminate the parcel and take pictures of the parcel. Optionally, the parcel may be rotated by the weighing device 96 so that pictures may be taken for different sides of the parcel. Measurement data are sent to the control system for calculation and analysis. For example, data of the pictures may be analyzed by certain algorithm to calculate three dimensions of the parcel. The space may also contain a printer to produce shipping labels and an attaching device that puts shipping labels on the parcel. The attaching device may have a flexible arm with a hand capable of taking a label from the printer and placing the label on a select outer surface of the parcel. After the user puts the parcel inside compartment 92, compartment door 88 may be closed automatically. The control system may send Service Center measurement data, calculation results, and other info collected from the parcel and the user. Thereafter, Service Center prepares a confirmation message including shipping charges and send the message to the user and the vehicle. The user may arrange a payment for the parcel and continues the journey in the vehicle.

When a user just wants to ship a parcel, the user may get in the vehicle, utter a shipping command, complete a check-in process, put a parcel inside compartment 92, and proceed with other procedures (e.g., verifying or providing a ship-to address). After the control system of the vehicle finishes shipping steps, it may print out a receipt or send a receipt to the user by email. Then the user may get out of and leave the vehicle.

Optionally, multiple parcel compartments may be configured inside a vehicle. After a user utters a command to ship a parcel, one of the compartments may be selected and assigned to the user. For example, a sign may be lightened to indicate an assigned compartment. The door of the assigned compartment may be unlocked or opened automatically.

FIG. 17 is an exemplary diagram illustrating a parcel ship/delivery vehicle 97 according to the present invention. Vehicle 97 may be an autonomous cargo-only vehicle that makes delivery to users and picks up parcels from users. For example, vehicle 97 may deliver a parcel to a house, a parcel box outside a building, a parcel box inside a building, and receive a parcel from a user by the roadside. The term "parcel box" as used herein indicates a storage unit for keeping a parcel temporarily. The storage unit has a door and a person may open it with a code or a recognition mechanism. A sign 98 with exemplary words "Ship/Deliver" is mounted on the roof of vehicle 97 that shows functions of the vehicle to the public. Sign 98 may be used to indicate the vehicle provides shipping service (e.g., accepting parcels from people), and deliver parcels to recipients. Vehicle 97 may be equipped with sensors to detect gestures and voice commands. As such, a user may hail vehicle 97 using various methods illustrated above, such as using gestures. After vehicle 97 stops beside a user, the user may open a compartment door 99 installed at the vehicle. Then, a compartment appears along with a touch screen for inputting info by the user. The compartment may have sensors and devices similar to that of compartment 92 of FIG. 16-B. The user may put a parcel on a weighing device in the compartment and proceed with shipping steps. Compartment door 99 as shown in FIG. 17 may be installed on a dual-use vehicle, too. As such, a user may put a parcel in the compartment without getting inside a vehicle.

Optionally, vehicle 97 may have multiple parcel compartments with doors, for example, similar to door 99. When a user utters a command or push a button to ship a parcel, one of the compartments may be selected and assigned to the user. For example, a sign may flash with light of certain color to indicate an assigned compartment. The door of the assigned compartment may be opened automatically. When a user ships multiple parcels, doors of the select compartments may be opened consecutively. The user may submit parcels one by one following instructions provided by the vehicle.

In some cases, a sign may also be mounted on a dual-use vehicle that carries a user and picks up parcels. The sign may be attached to the exterior of the vehicle or placed behind the windshield. Examples of signs for the dual-use vehicle may include, for example, "Ride/Ship", "Taxi/Shipping", "Accept Parcels", etc. Such signs show people around it that the vehicle not only takes passengers for a ride, but also picks up or accepts parcels from people and performs shipping service.

FIG. 18 shows an exemplary flow diagram for a vehicle to pick up a parcel from a user (or assist shipping service). Referring to buttons 78, 80, and 82 as shown in FIG. 15, after a user taps button 78, Service Center may dispatch a vehicle to receive a parcel at a specified location at the current time or within a short time period. If the user taps button 80, Service Center dispatches a vehicle to pick up a parcel at a specified location at a scheduled time. If the user taps button 82, Service Center waits for the user to hail a vehicle for a ride, and dispatches a vehicle to pick up the user in response to a hailing request to go to a place. The hailed vehicle may receive a parcel from the user before the ride, during the ride, or after the ride. The specified location for parcel pickup or user pickup is determined by the user and may be a location by the roadside, beside the curb of a road, at a parking spot or parking lot, or in a driveway.

As shown in FIG. 18, a select vehicle receives a dispatching message from Service Center at step 174. The vehicle may be driving on a road or parking at a place. At step 176, the vehicle navigates to a pickup location according to the dispatching message. When the vehicle is close to the pickup location, e.g., about 50 to 100 meters, it determines the pickup location based on maps and three dimensional (3D) sensing data obtained from detectors, and starts searching for the user who has made a hailing and/or shipping request at step 178. The control system may retrieve user data from Service Center at this step or the previous step. Optionally, Service Center may also send the user data to the control system. The user data may include information about the user, such as the name of the user, an account number of the user, a password for the account, a specific code for login, etc. Optionally, the user data may also include an image that shows the full face of the user, facial recognition data, and/or fingerprint data.

The control system of the vehicle may operate a camera to take pictures of the pickup location and use certain algorithm to detect people in the pictures. If there is one person, the person may be the target user who made the request. When there are multiple persons, the control system may monitor them and ascertain their actions. If it is detected that a person waves, gestures, or step forward toward the vehicle, the person may be the target user. The control system may also identify the target user using images of the user or through facial recognition techniques, when relevant user data is retrieved from Service Center.

At step 180, the vehicle stops at the pickup location. If a user is determined as the target user, the vehicle may stop beside the user. The control system may unlock the doors of the vehicle and provide options for the user to check in, i.e., providing options for the user to submit identification data. If the user chooses facial recognition or fingerprint recognition when making the hailing or shipping request, the user may be identified by the control system via these methods. The user may also get identified by entering a user name and a password or a code (e.g., a number or a combination of numbers and letters) via a touch screen at the vehicle, using a smartphone (e.g., using a smartphone number), using an identification card or credit card, or having a QR (quick response) code scanned.

Before or after the user is identified, the user may utter "Ship parcel". The control system receives the verbal command through a microphone and voice recognition mechanism, and starts preparing to obtain a package from the user. After the check-in process, the user places a parcel in the vehicle, e.g., in a parcel compartment. As such, the control system receives the parcel at step 182. Shipping information (e.g., the recipient name, ship-to address, ship-from address, etc.) that the user has provided is transferred from Service Center to the vehicle. If the shipping information is missing or inadequate, the user enters it at the vehicle. The control system performs shipping procedures that are part of the shipping service at step 184. The shipping procedures (or shipping steps) may include, for example, checking the ship-to address, detecting and reading words and/or labels on the parcel, measuring the weight and size of the parcel, calculating shipping fees, presenting shipping fees to the user, making shipping labels, attaching shipping labels to the parcel, processing a payment for the shipping cost, and/or printing a shipping receipt.

If the vehicle is a cargo-only vehicle, the user may stand beside it and proceed with the procedures. If the vehicle is a dual-use vehicle, two options are available. The vehicle may accept the parcel and perform the shipping procedures as depicted above without providing a ride service. As the other option, the vehicle may carry the user for a ride to a destination, while the parcel may be received and shipping procedures performed before the ride, during the ride, or after the ride (i.e., after arriving at the destination). For example, the user may be identified by one of the identification methods illustrated above after getting in the vehicle (e.g., at step 180). Then the user provides or confirms a destination for a ride. The control system of the vehicle calculates a route to go to the destination and navigates the vehicle to go there along the route. The user may hand a parcel to the vehicle anytime. Correspondingly, the control system of the vehicle may perform shipping procedures before or after navigating the vehicle to the destination.

Steps 180-184 also apply to scenarios when a user hails a vehicle with gestures by the roadside. After a user hails a vehicle using gestures, the user may proceed with check-in and shipping procedures as depicted above.

Embodiments illustrated above apply to both autonomous vehicles and driver-operated vehicles. For example, a driver (e.g., a taxi driver or a driver of a ride sharing program) may drive a vehicle (e.g., a dual-use vehicle) that has a parcel compartment or a space for receiving and keeping a parcel. Optionally, the vehicle may also have devices to measure items such as the weight and size of a parcel. The driver may pick up a person for a ride to a place. The driver may also pick up a person for a ride, receive a parcel from the person, proceed with shipping steps, drive to a destination to complete the ride, and take the parcel to a recipient of the parcel, a station, a warehouse, or another vehicle that works as a movable collecting station.

CONCLUSION, RAMIFICATIONS, AND SCOPE

Thus it can be seen that systems and methods are introduced for hailing a vehicle for a ride and for shipping a parcel.

The systems and methods have the following main features and advantages:

(1) A user may hail a vehicle by gestures when seeing it;
(2) A user may hail a nearby vehicle via an app or via an app plus gestures;
(3) A user may search vehicles within a short distance using an app;
(4) A vehicle may monitor a user and detect hailing gestures;
(5) A vehicle may navigate to a user autonomously after the user hails it;
(6) A vehicle may stay at a place waiting for a user after the user hails it and then walks toward it;
(7) A vehicle hailing app or program may provide three options for a user: Hailing a vehicle for a ride, hailing a vehicle for parcel shipping, and hailing a vehicle for a ride and parcel shipping;
(8) A vehicle may be dispatched to a user after user places a shipping request via a vehicle hailing app;
(9) A vehicle may provide three options for a user: A ride to a place, a process to ship a parcel, and a combination thereof;
(10) A vehicle may perform shipping service including measuring the weight and dimensions of a parcel; and
(11) A vehicle may contain a parcel compartment that has measurement devices.

Although the description above contains many specificities, these should not be construed as limiting the scope of the invention but as merely providing illustrations of some of the presently preferred embodiments. Numerous modifications will be obvious to those skilled in the art.

Ramifications:

A vehicle may detect and recognize a gesture through certain algorithm and convert the gesture into instructions. Besides waving a hand, raising a hand, and using a finger to point at a vehicle, other hand signs, such as a "Come here" hand signal, may also be used as hailing gestures. While gesturing, a user has to face the vehicle; otherwise, the gestures are ignored. When a user is close to a vehicle, the user may also nod to contact, select, or hail a vehicle. Nodding may be especially useful for contacting or hailing a robot, as a user may meet a robot at a close distance. In addition, gazing may be combined with nodding to reduce miscommunication. A gazing act as used herein may indicate a user gazes or looks at a vehicle. For instance, a vehicle may start gaze sensing procedures when it detects a user nods at it. Gaze sensing may be turned off when nodding is not detected or certain conditions are not satisfied, as users may prefer less surveillance. Optionally it may be configured that only when nodding and gazing acts happen at the same time, the nodding act is recognized. Service Center may decide to use nodding alone or nodding plus gazing as a command. Alternatively, options may be provided to a user so that the user may enable a method. As aforementioned, vehicles as used herein include automobiles, robots, drones, flying cars, and ships. Thus hailing gestures apply to all of them.

A facial recognition system or mechanism of a vehicle may be used to identify a user and match the user with an account in records during a check-in process. For example, a user may submit facial data to Service Center and then check in a vehicle via facial recognition and without using a code, fingerprint, credit card, or cash. A facial recognition system may also be used to estimate the age of an unregistered user. For instance, a user under certain age may not be allowed to hail a vehicle. When a vehicle detects that a person gestures at it, it may use a facial recognition mechanism to ascertain whether the person is under certain age. That is, it may determine whether the person is a child. If the person is a child, the vehicle stops the hailing activity. As such, it may protect children and prevent pranks. Rules about how to determine a person is a child may be defined by Service Center. In addition, images of a user may also be used to estimate the age. For instance, a user's height, contour, hair style, and cloths may be analyzed for age estimation.

In descriptions above, a user taps a button to enter an input and interact with an app and a user device. Alternatively, a user may also speak to a device. The device may use a voice recognition mechanism to take and interpret voice commands. For instance, a user may utter "Yes" or "No" to phone 38 of FIGS. 11 and 12, which may be arranged to have the same effect as tapping button 64 or 66. A user may also utter one or a few words which have the meaning of yes or no, like "Good", "Okay", "Come here", "I'm waiting", "No, wrong car", etc.

When a control system of a vehicle has a voice recognition mechanism, a user may also utter to the vehicle when his or her voice is audible to it. For instance, a user may say certain keywords like "Taxi", "You", or "I need a vehicle" to select or hail a vehicle. As a vehicle may have gaze detection capability, a gazing requirement may apply. For instance, a user may have to look at a vehicle when issuing a verbal command. If a vehicle detects that a user doesn't look at it while saying something, the user's verbal input may be ignored. Alternatively, a gazing requirement may be replaced by a facing requirement, i.e., a user may also face a vehicle while speaking to it. Service Center may decide whether to implement the gazing or facing requirement. A user may say words or a phrase like "Taxi", "I Need a vehicle", "Parcel service", or "Come here" to hail a vehicle with or without making hailing gestures. A vehicle may keep monitoring the surroundings and especially people around it. After receiving a user's voice request, the vehicle sends a message to Service Center for approval. Once getting an approval message from the center, the vehicle calculates a route and approaches the user autonomously.

A user may also use an AR device to hail a vehicle for a ride or parcel shipping. For instance, a user may open an app and then say "Show cars around me". After the AR device sends a request to Service Center and receives vehicle info from the center, it displays a map to show available vehicles nearby. If the user says "Pointing mode", the app replaces a regular map by an elongated map. For AR devices, the pointing direction may be the direction which a user faces. Thus when a user looks ahead, an AR device may show an elongated map on a virtual display. The map shows an area which is in front of the user.

Sometimes a user may change mind after hailing a vehicle and the vehicle is on the way to approach him or her. Regardless that the vehicle has arrived or not, the user may cancel the hailing event. For instance, the user may tap button 66 of FIG. 11 to cancel it as described above. A user may also wave at a direction away from a coming vehicle. A vehicle may monitor a hailing user continuously. Once the vehicle detects that the user waves at another object for a given period of time, it may determine that the user cancels the reservation. If the vehicle detects that the user waves at another object briefly and then waves at it again, it may consider the user still wants to keep the reservation. The vehicle then continues moving toward the user. The same strategy applies to a user walking to a vehicle. For instance, a user may stop walking to a target vehicle and wave at a direction away from the vehicle for a certain time period. After the vehicle detects the waving act, it may treat it as a signal to cancel the reservation.

Lastly, a vehicle may be arranged to handle a hailing process with less or no instructions from Service Center depending on prearrangements. For instance, after a vehicle detects that a user is waving at it, the vehicle may calculate a route and set forth a short journey to drive to the user. During the hailing steps, Service Center is not involved. The method may be favored by small ride-hailing companies. In other cases, a vehicle may maintain contact with Service Center and communicate to the center constantly. However, the vehicle may not need approval from the center during a hailing process. Service Center may work as an info source and play a messenger role between the vehicle and a user.

Therefore the scope of the invention should be determined by the appended claims and their legal equivalents, rather than by the examples given.

The invention claimed is:

1. A method for a vehicle or device for assisting a service, comprising:
   1) detecting an act or gesture of a user using one or more sensors;
   2) determining whether the user waves or gestures and whether the user faces the vehicle or device;
   3) after determining that the user waves or gestures and the user faces the vehicle or device, calculating a route and navigating the vehicle or device to the user along the route;
   4) receiving a parcel from the user; and
   5) performing a shipping procedure.

2. The method according to claim 1 wherein navigating the vehicle or device to the user along the route includes navigating the vehicle or device to the user along the route after the one or more sensors detect that the user does not move toward the vehicle or device.

3. The method according to claim 1, further including stopping navigating the vehicle or device to the user and waiting for the user after the one or more sensors detect that the user moves toward the vehicle or device.

4. The method according to claim 1, further including receiving a shipping request from the user after navigating the vehicle or device to the user.

5. The method according to claim 1, further including presenting a sign that shows the vehicle or device accepts a package or provides shipping service.

6. The method according to claim 1 wherein the gesture includes a waving act, a pointing act, or a nodding act.

7. The method according to claim 1, further including searching for the user after receiving information from a service facility and before detecting the act or gesture of the user.

8. A method for a vehicle or device for assisting a service, comprising:
  1) driving to a location after receiving information about a user from a service facility and presenting a sign that is mounted on an exterior of the vehicle and shows the vehicle or device accepts a package and provides a shipping service;
  2) searching for the user using one or more sensors when approaching the location;
  3) stopping the vehicle or device beside the user;
  4) receiving a parcel from the user at the vehicle or device; and
  5) performing a shipping procedure for the user, the shipping procedure including printing out a label for shipping the parcel using a printer installed at the vehicle or device.

9. The method according to claim 8 wherein the location includes a roadside spot or a spot for the vehicle or device to stay temporarily.

10. The method according to claim 8, further including identifying the user using a facial recognition method, a fingerprint method, a password, a code, a QR code, an identification provided by a phone, or an identification card.

11. The method according to claim 8, further including determining whether the user waves or gestures and whether the user faces the vehicle or device when the vehicle or device approaches the location.

12. The method according to claim 8, further including picking up the user at the location and navigating the vehicle to a destination.

13. The method according to claim 8 wherein the shipping procedure further includes measuring a weight of the parcel and/or a dimension of the parcel.

14. The method according to claim 8, further including receiving a command from the user and carrying the user for a ride to a destination according to the command.

15. A method for providing a service for a ride and shipping a parcel, comprising:
  1) obtaining information of a destination from a user or a service facility at a vehicle;
  2) obtaining a route for the ride for the user to go to the destination using a processor;
  3) navigating the vehicle to provide the ride for the user to go to the destination along the route;
  4) receiving a parcel from the user during the ride to the destination;
  5) obtaining an address where the parcel is shipped to; and
  6) performing a shipping procedure at the vehicle for the user during the ride, the shipping procedure including printing out a label for shipping the parcel using a printer installed at the vehicle.

16. The method according to claim 15 wherein the shipping procedure further includes measuring a weight of the parcel and/or a dimension of the parcel.

17. The method according to claim 15, further including identifying the user using a facial recognition method, a fingerprint method, a password, a code, a QR code, an identification provided by a phone, or an identification card.

18. The method according to claim 15, further including driving to a location to pick up the user after receiving information about the user from the service facility.

19. The method according to claim 15, further including presenting a sign that shows the vehicle accepts a package or provides shipping service.

20. The method according to claim 15 wherein the vehicle includes one or more devices that scan the parcel, measure a weight of the parcel, and/or measure a dimension of the parcel.

* * * * *